United States Patent
Yamaguchi et al.

(10) Patent No.: US 7,460,555 B2
(45) Date of Patent: Dec. 2, 2008

(54) TERMINAL APPARATUS

(75) Inventors: Tsuyoshi Yamaguchi, Osaka (JP); Shinichiro Ohmi, Osaka (JP); Go Kuroda, Osaka (JP)

(73) Assignee: Panasonic Corporation, Osaka (JP)

( * ) Notice: Subject to any disclaimer, the term of this patent is extended or adjusted under 35 U.S.C. 154(b) by 654 days.

(21) Appl. No.: 11/242,942

(22) Filed: Oct. 5, 2005

(65) Prior Publication Data
US 2006/0077997 A1   Apr. 13, 2006

(30) Foreign Application Priority Data
Oct. 7, 2004   (JP) .............................. 2004-295344

(51) Int. Cl.
*H04L 12/413*   (2006.01)

(52) U.S. Cl. .................. 370/447; 370/462; 709/225

(58) Field of Classification Search ......... 370/445–451, 370/454, 456, 461–462, 400, 402; 709/225, 709/235
See application file for complete search history.

(56) References Cited

FOREIGN PATENT DOCUMENTS

| | | |
|---|---|---|
| JP | 2531367 | 6/1996 |
| JP | 2000-138685 | 5/2000 |

*Primary Examiner*—Aung S. Moe
*Assistant Examiner*—Feben Haile
(74) *Attorney, Agent, or Firm*—Wenderoth, Lind & Ponack, L.L.P.

(57) ABSTRACT

When operating as a control terminal and recognizing interference from another logical network, a terminal apparatus determines whether or not a logical network to be controlled is unified with the other logical network. When unification is determined, the terminal apparatus determines whether a control terminal of a logical network newly created by unification is the terminal apparatus or a control terminal of the other logical network.

13 Claims, 26 Drawing Sheets

FIG. 4

| SECURITY LEVEL | SYNOPSIS |
| --- | --- |
| 0 | RESERVED |
| 1 | ALL TERMINALS REQUESTING PARTICIPATION ARE ACCEPTED<br>COMMUNICATION IS PERFORMED IN PLAIN TEXT |
| 2 | ALL TERMINALS REQUESTING PARTICIPATION ARE ACCEPTED<br>INVARIABLE ENCRYPTION KEY FOR COMMUNICATION IS USED WHICH IS INFORMED OF FROM CONTROL TERMINAL |
| 3 | ONLY TERMINAL APPARATUSES WHICH ARE PREVIOUSLY REGISTERED AS BEING PERMITTED FOR PARTICIPATION ARE AUTHENTICATED<br>INVARIABLE ENCRYPTION KEY FOR COMMUNICATION IS USED WHICH IS INFORMED OF FROM CONTROL TERMINAL |
| 4 | ONLY TERMINAL APPARATUSES WHICH ARE PREVIOUSLY REGISTERED AS BEING PERMITTED FOR PARTICIPATION ARE AUTHENTICATED<br>COMMUNICATION ENCRYPTION KEY IS USED WHICH IS INFORMED OF FROM CONTROL TERMINAL AND CAN BE CHANGED DURING OPERATION |
| 5 | ONLY TERMINAL APPARATUSES WHICH ARE PREVIOUSLY REGISTERED AS BEING PERMITTED FOR PARTICIPATION ARE AUTHENTICATED<br>COMMUNICATION IS NOT PERFORMED TO INFORM KEY, AND ENCRYPTION KEY PREVIOUSLY PREPARED IN EACH TERMINAL APPARATUS IS USED |

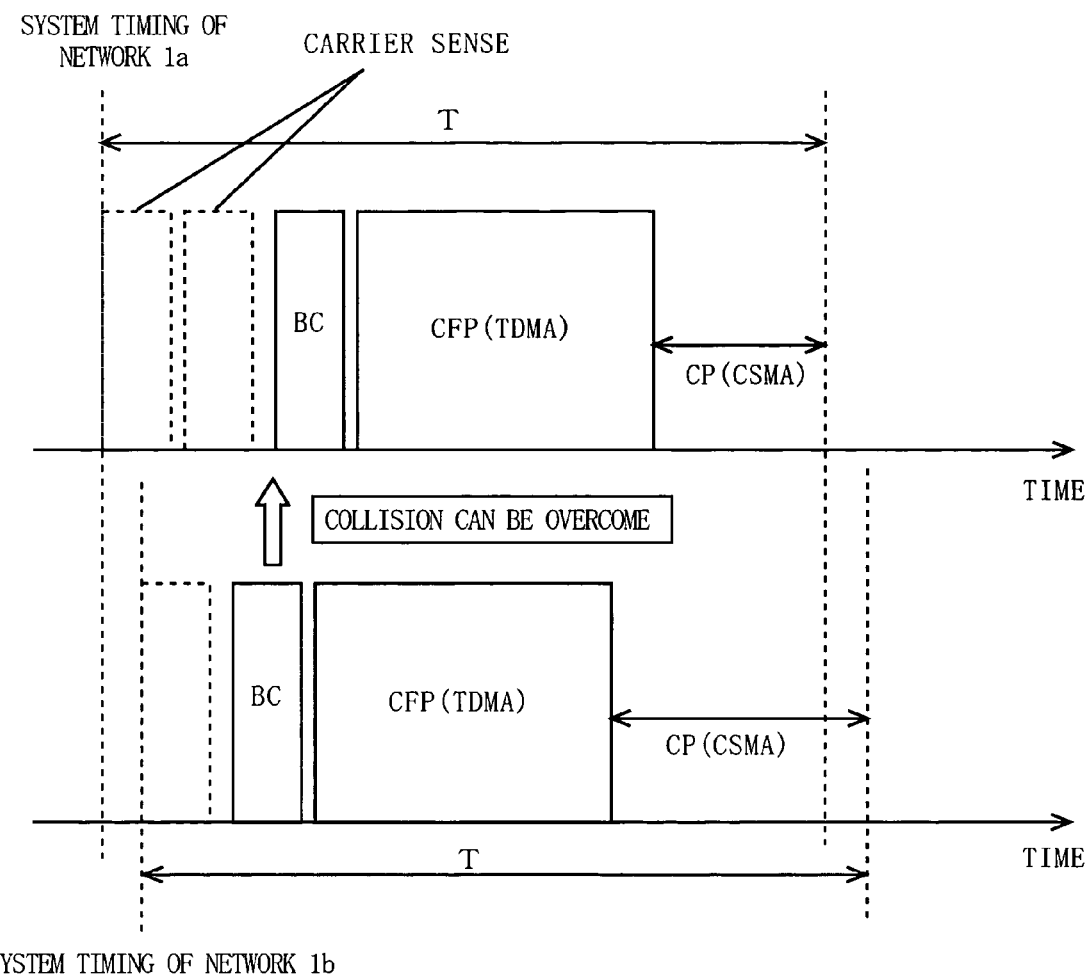
F I G. 1 2

F I G. 1 7
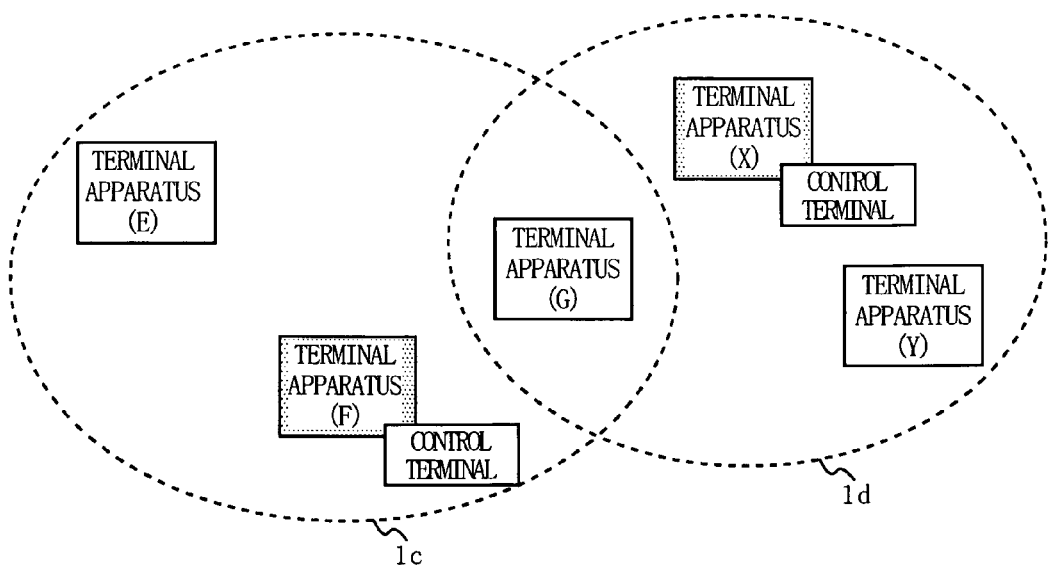
F I G. 1 8
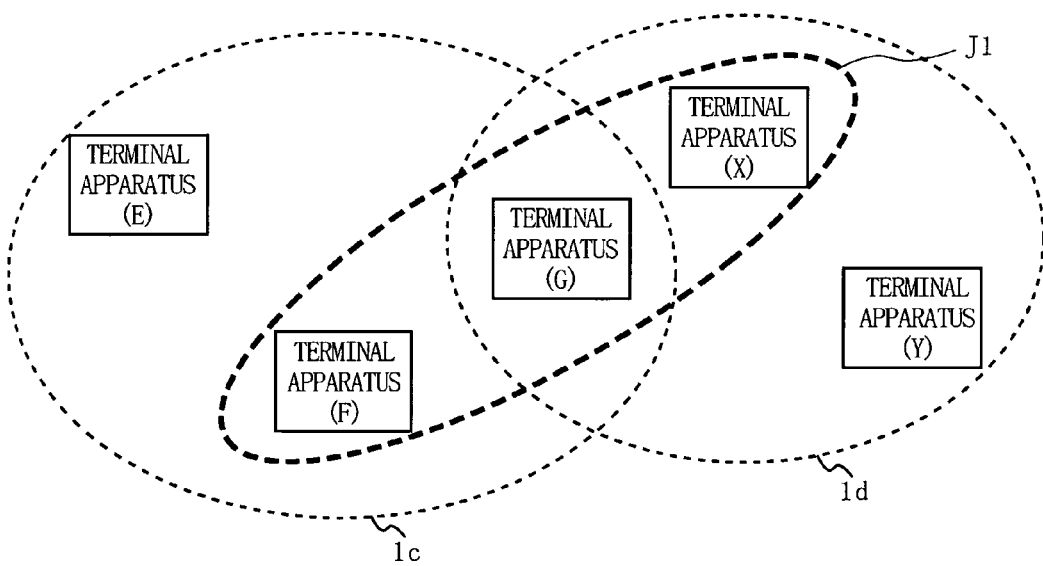

F I G. 2 1
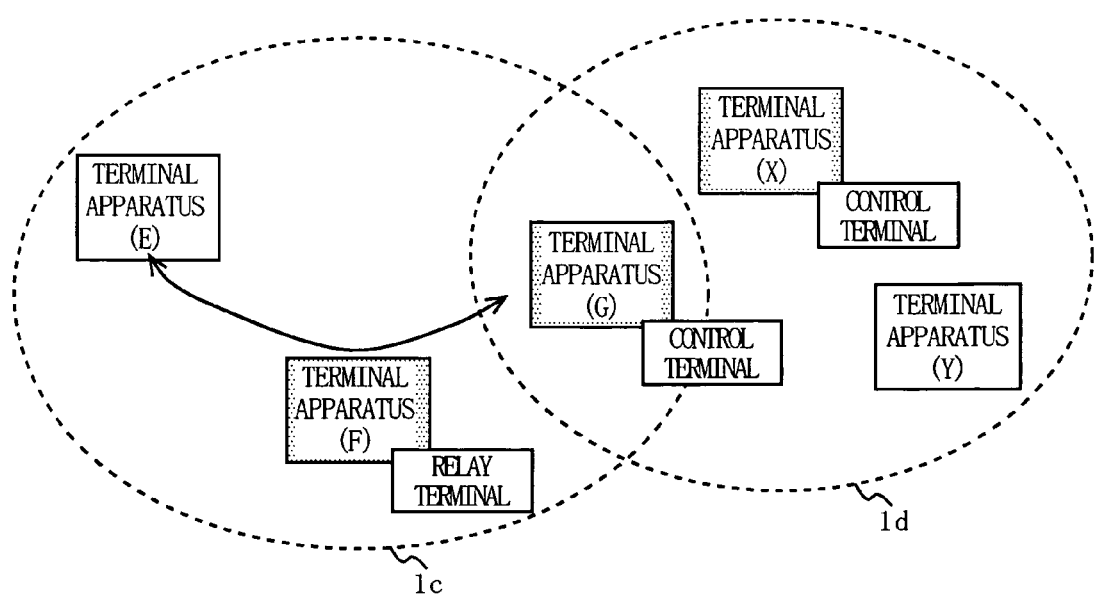

F I G. 2 7
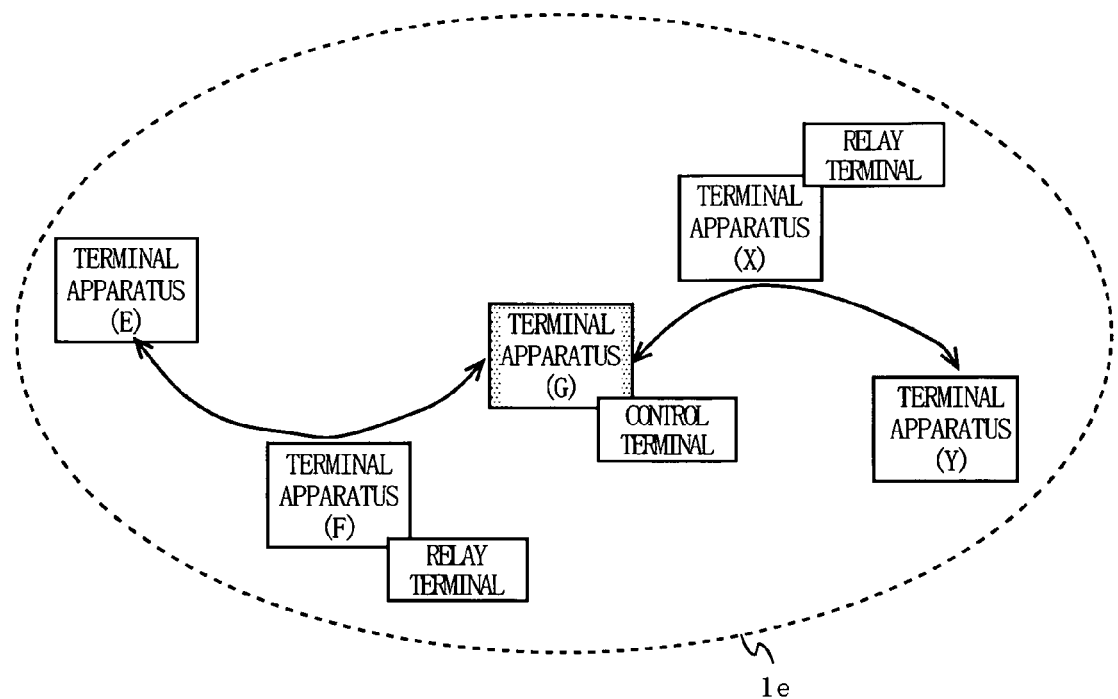

TERMINAL APPARATUS

BACKGROUND OF THE INVENTION

1. Field of the Invention

The present invention relates to a terminal apparatus which performs communication via a communication medium. More particularly, the present invention relates to a terminal apparatus which is used in a system which controls an opportunity to access a communication medium.

2. Description of the Background Art

As broad-band access line infrastructures are built and widespread, and home network appliances are developed, there is a demand for construction of an infrastructure for a home network having an access line with high transmission ability.

If an inexpensive and high-speed digital network can be constructed as a home network infrastructure without laying a new physical cable (hereinafter referred to as a physical communication dedicated cable), the user will have a great benefit. As a method which does not require a new physical communication dedicated cable, a method of using an existing wired cable, such as a power line, a telephone line, a television antenna line, or the like, for high-frequency communication, a method of providing a wireless network, and the like have been proposed. These communication media are not dedicated media for high-speed digital communication, so that a sufficient band may not be provided and the reliability of data transmission may be poor.

In such a communication system which uses a communication medium having a problem in communication quality, an efficient and effective network protocol is required. Conventional network protocols handle terminals on a network equally. Therefore, each terminal needs to subjectively access a communication medium. In other words, conventional network protocols are each confined as a process within a single terminal. Therefore, data transmission delay or data jitter is likely to occur.

However, when video, audio, or voice information is transmitted in packets, delay or jitter needs to be strictly limited. In conventional network protocols, packets containing video, audio, or voice information cannot be transmitted with high quality.

In order to achieve an efficient control of traffic of a whole network, a network protocol has been developed, in which a terminal of a logical network is used as a control terminal for controlling medium access of other terminal(s), i.e., the other terminals are controlled terminals (hereinafter referred to as a centralized control type medium access control method).

In the centralized control type medium access control method, the control terminal controls opportunities of access of other terminal(s) to a communication medium. Therefore, the efficiency of use of the medium on the whole network is significantly influenced, depending on which terminal within a single logical network serves as a control terminal. Therefore, it is important and difficult to select a control terminal.

Such a problem is conventionally solved in, for example, the conventional centralized control type medium access control method by causing each terminal of a network to recognize the number of terminals with which that terminal can perform direct wireless communication, and changing control terminals so that a terminal having the largest number of terminals with which that terminal can perform direct wireless communication serves as a control terminal. By dynamically selecting a control terminal in this manner, a traffic control of a whole network can be efficiently performed.

Japanese Patent Laid-Open Publication 2000-138685 discloses a conventional centralized control type medium access control method in which a terminal activated within a network is caused to perform carrier sense for a predetermined period, and if the terminal cannot recognize a frame(s) issued by other terminal(s) in a channel (frequency transmission channel) which is used in communication, during the carrier sense, the activated terminal is caused to operate as a control terminal. By automatically setting a control terminal at an early stage of construction of a logical network in this manner, a smooth operation of the logical network can be achieved.

However, in the conventional centralized control type medium access control method, there is a possibility that a plurality of logical networks are automatically created within a single communication medium which is controlled by a user. Particularly, when the communication medium is a power line, a plurality of logical networks may be created in the communication medium due to a short-term transmission channel failure or the specificity of power line wiring.

When a plurality of logical networks are created in a single communication medium controlled by the user as described above, data transmission between terminals may be redundant against the user's intention. The reason is the following. It is assumed that two logically different logical networks are physically adjacent to each other, and there is a transmission channel of a communication medium via which two terminals belonging to the respective two different logical networks can perform direct communication. In such a case, the centralized control type network control method cannot achieve direct communication between terminals of the different logical networks unless a particular technique is used. Therefore, by causing a control terminal to relay a frame, it is possible to achieve communication between terminals of the different logical networks. When a frame is transmitted via a control terminal in this manner, the use of the communication medium has redundancy. Therefore, when a plurality of logical networks are created, data transmission between terminals may be redundant against the user's intention.

In other words, the centralized control type network control method aims efficient use of a communication medium within a single logical network. Therefore, when a plurality of logical networks are created adjacent to each other, the efficiency of use of the communication medium may be reduced, resulting in impairment of network service which is expected by the user.

SUMMARY OF THE INVENTION

Therefore, an object of the present invention is to provide a terminal apparatus for constructing a network on which a reduction in the efficiency of use of a communication medium can be prevented, when a plurality of logical networks are created physically adjacent to each other in the single communication medium.

In order to solve the above-described problems, the present invention has the following features. A first aspect of the present invention is directed to a terminal apparatus of communicating with at least one other terminal apparatus via a communication medium, comprising an operation mode setting section operable to set the terminal apparatus to operate as a control terminal controlling an opportunity of access of the other terminal apparatus to the communication medium or as a controlled terminal whose opportunity of access to the communication medium is controlled by another terminal apparatus operating as a control terminal, an interference recognizing section operable to recognize interference from at least one logical network other than a logical network to be controlled, when the operation mode setting section sets the terminal apparatus to operate as the control terminal, a unification determining section operable to determine whether or not the logical network to be controlled is unified with the other logical network, when the interference recognizing section recognizes the interference from the other logical network, and a new control terminal determining section operable to determine whether a control terminal of a logical network newly created by unification is the terminal apparatus or a control terminal of the other logical network, when the unification determining section determines that the logical network to be controlled is unified with the other logical network. The operation mode setting section sets the terminal apparatus to operate as the control terminal of the newly created logical network, when the new control terminal determining section determines that the control terminal of the newly created logical network is the terminal apparatus. The operation mode setting section sets the terminal apparatus to operate as a controlled terminal of the newly created logical network, when the new control terminal determining section determines that the control terminal of the newly created logical network is the control terminal of the other logical network.

Preferably, the operation mode setting section may set the terminal apparatus to operate as a relay terminal of the newly created logical network, when the new control terminal determining section determines that the control terminal of the newly created logical network is the control terminal of the other logical network.

Preferably, the unification determining section may determine that the local network to be controlled is unified with the other logical network, when the logical network to be controlled and the other logical network are under a control of the same user.

Preferably, the unification determining section may determine that the local network to be controlled is unified with the other logical network, when unification of the logical network to be controlled and the other logical network is permitted by a user.

Preferably, the unification determining section may determine that the local network to be controlled is unified with the other logical network, when unification of the logical network to be controlled and the other logical network is permitted by another terminal apparatus within the other logical network.

Preferably, when the terminal apparatus operates as the control terminal, the interference recognizing section may perform carrier sense before issuing a frame, to recognize the interference from the other logical network.

Preferably, when the terminal apparatus operates as the control terminal and recognizes a signal from another logical network, the terminal apparatus may operate so that network cycle start timing of a logical network to which the terminal apparatus belongs is synchronized with network cycle start timing of the other logical network, and transmits a beacon by random backoff.

Preferably, when the terminal apparatus operates as the controlled terminal, and the interference is detected from the other logical network, the controlled terminal may inform the control terminal that the interference from the other logical network has been detected.

Preferably, the terminal apparatus may further comprises a control terminal absence determining section operable to determine whether or not the control terminal is absent. When the control terminal absence determining section determines that the control terminal is absent, the terminal apparatus may start an operation for determining a new control terminal.

Preferably, the communication medium may be divided into a plurality of channels, the interference recognizing section may recognize the interference from the other logical network by detecting another logical network which uses a channel different from a channel used by a logical network to which the terminal apparatus belongs, the unification determining section may determines a channel used after unification, and after logical network unification, the channel after unification determined by the unification determining section may be used to perform communication.

A second aspect of the present invention is directed to a processing method of a communication terminal communicating with at least one other terminal apparatus via a communication medium, comprising the steps of setting the communication terminal to operate as a control terminal controlling an opportunity of access of the other terminal apparatus to the communication medium or as a controlled terminal whose opportunity of access to the communication medium is controlled by another terminal apparatus operating as a control terminal, recognizing interference from at least one logical network other than a logical network to be controlled, when the communication terminal is set to operate as the control terminal, determining whether or not the logical network to be controlled is unified with the other logical network, when the interference from the other logical network is recognized, and determining whether a control terminal of a logical network newly created by unification is the communication terminal or a control terminal of the other logical network, when it is determined that the logical network to be controlled is unified with the other logical network, setting the communication terminal to operate as the control terminal of the newly created logical network, when it is determined that the control terminal of the newly created logical network is the communication terminal, and setting the communication terminal to operate as a controlled terminal of the newly created logical network, when it is determined that the control terminal of the newly created logical network is the control terminal of the other logical network.

A third aspect of the present invention is directed to a program for operating a computer apparatus communicating with at least one other terminal apparatus via a communication medium, the program causing the computer apparatus to perform the steps of setting the communication terminal to operate as a control terminal controlling an opportunity of access of the other terminal apparatus to the communication medium or as a controlled terminal whose opportunity of access to the communication medium is controlled by another terminal apparatus operating as a control terminal, recognizing interference from at least one logical network other than a logical network to be controlled, when the communication terminal is set to operate as the control terminal, determining whether or not the logical network to be controlled is unified with the other logical network, when the interference from the other logical network is recognized, determining whether a control terminal of a logical network newly created by unification is the communication terminal or a control terminal of the other logical network, when it is determined that the logical network to be controlled is unified with the other logical network, setting the communication terminal to operate as the control terminal of the newly created logical network, when it is determined that the control terminal of the newly created logical network is the communication terminal, and setting the communication terminal to operate as a controlled terminal of the newly created logical network, when it is determined that the control terminal of the newly created logical network is the control terminal of the other logical network.

A fourth aspect of the present invention is directed to an integrated circuit provided in a terminal apparatus communicating with at least one other terminal apparatus via a communication medium, comprising an operation mode setting section operable to set the terminal apparatus to operate as a control terminal controlling an opportunity of access of the other terminal apparatus to the communication medium or as a controlled terminal whose opportunity of access to the communication medium is controlled by another terminal apparatus operating as a control terminal, an interference recognizing section operable to recognize interference from at least one logical network other than a logical network to be controlled, when the operation mode setting section sets the terminal apparatus to operate as the control terminal, a unification determining section operable to determine whether or not the logical network to be controlled is unified with the other logical network, when the interference recognizing section recognizes the interference from the other logical network, and a new control terminal determining section operable to determine whether a control terminal of a logical network newly created by unification is the terminal apparatus or a control terminal of the other logical network, when the unification determining section determines that the logical network to be controlled is unified with the other logical network. The operation mode setting section sets the terminal apparatus to operate as the control terminal of the newly created logical network, when the new control terminal determining section determines that the control terminal of the newly created logical network is the terminal apparatus, and the operation mode setting section sets the terminal apparatus to operate as a controlled terminal of the newly created logical network, when the new control terminal determining section determines that the control terminal of the newly created logical network is the control terminal of the other logical network.

According to the present invention, when a terminal apparatus operates as a control terminal and recognizes interference from another logical network, the terminal apparatus determines whether or not logical network unification is performed. When it is determined that logical network unification is performed, a control terminal of a new logical network after unification is determined from control terminals of at least two logical networks before unification. When a control terminal is determined, the terminal currently operating as a control terminal is to operate as a control terminal again or as a controlled terminal. Thus, when a plurality of logical networks are created and interference occurs, the plurality of logical networks are unified into a single logical network, and therefore, it is no longer necessary to take into consideration influence from other logical network(s) to perform communication, resulting in a simple protocol. Therefore, it is possible to improve the efficiency of use of a communication medium. Further, when each logical network does not support a protocol which performs communication while considering influence from other logical network(s), the probability of occurrence of frame collision can be reduced by unifying logical networks into one. Thereby, it is possible to provide a terminal apparatus which is used to construct a network and can prevent the reduction of the efficiency of use of a communication medium when a plurality of logical networks are created in a single communication medium, physically adjacent to each other.

When logical network unification is performed, an original control terminal which is to be a controlled terminal is subsequently operated as a relay terminal, thereby making it possible to transmit/receive a frame on an entire network.

By unifying logical networks under a control of the same user, when a plurality of logical networks are created against the user's intention, the logical networks can be unified.

By unifying logical networks when permission is given by the user, when a plurality of logical networks are created in accordance with the user's intention, it is possible to prevent logical networks from being unified without permission.

When unification is permitted by a terminal apparatus of another logical network, logical network unification can be performed, considering convenience on the other logical network.

A control terminal can be expected to certainly detect interference from another logical network, by performing carrier sense before issuing a beacon to detect interference from another logical network; transmitting a beacon by random backoff, where the network cycle start timing of a logical network to which the control terminal belongs is synchronized with the network start timing of the other logical network; accessing a communication medium in accordance with a beacon previously received by the controlled terminal, and when interference from another logical network is detected, informs the control terminal of the detection.

When the absence of a control terminal is detected, by determining a new control terminal, a once-unified logical network can be separated. Thereby, network efficiency is improved.

When a communication medium uses a plurality of channels, a unified channel is determined, and the determined channel is used to unify logical networks, thereby improving the transmission efficiency of a network.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating exemplary security levels;

FIG. 12 is a diagram illustrating an exemplary timing chart when a beacon issuance start slot is set and beacon issuance timing is shifted using random backoff;

FIG. 17 is a schematic diagram illustrating a structure of a whole system when a terminal apparatus G newly participates in the logical network $1c$;

FIG. 18 is a diagram illustrating a range J1 within which the terminal apparatus G can perform communication;

FIG. 21 is a schematic diagram illustrating a whole structure of a system when a terminal apparatus F operates as a relay terminal and a terminal apparatus G operates as a control terminal;

FIG. 27 is a schematic diagram illustrating a structure of a logical network $1e$ after unification;

DESCRIPTION OF THE PREFERRED EMBODIMENTS

First Embodiment

Figure 1:
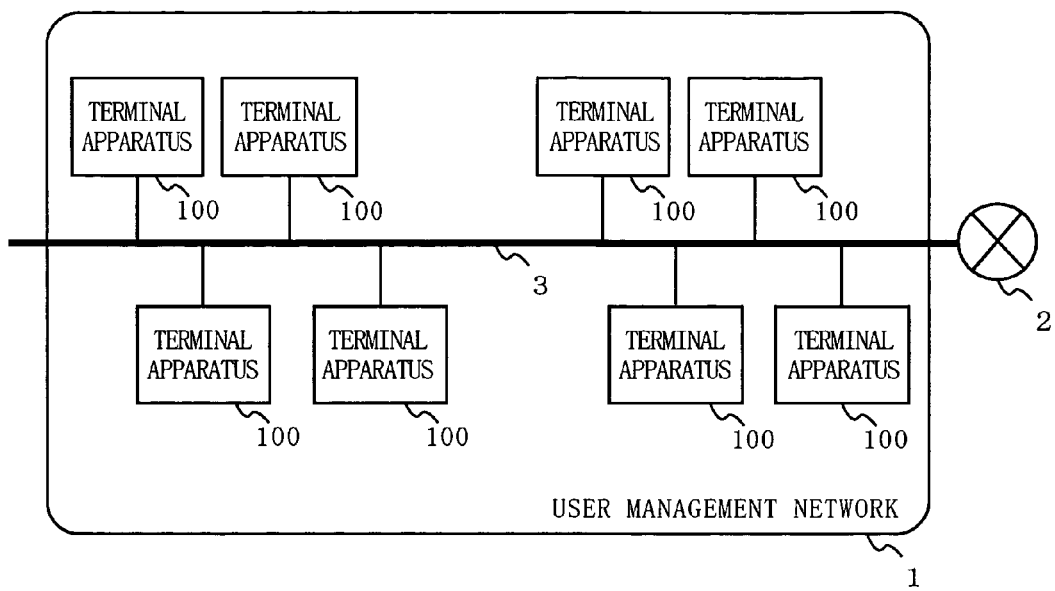
FIG. 1 is a diagram illustrating a structure of a whole system according to a first embodiment of the present invention.

FIG. 1 is a diagram illustrating a structure of a whole system according to a first embodiment of the present invention. In FIG. 1, the system comprises a user management network 1 and an external network 2. The user management network 1 comprises a plurality of terminal apparatuses 100 which are connected together via a communication medium 3. Although eight terminal apparatuses 100 are illustrated in FIG. 1, the number of terminal apparatuses 100 is not limited to this. One terminal apparatus 100 transmits and receives a frame to and from at least one other terminal apparatus 100 via the communication medium 3. Although the communication medium 3 is illustrated as a wired medium in FIG. 1, it may be a wireless medium. On the user management network 1, for example, video transmission, audio transmission, voice transmission, Web browsing, file transfer, or the like is performed. The user management network 1 is operated in accordance with a centralized control type network control method.

Figure 2:
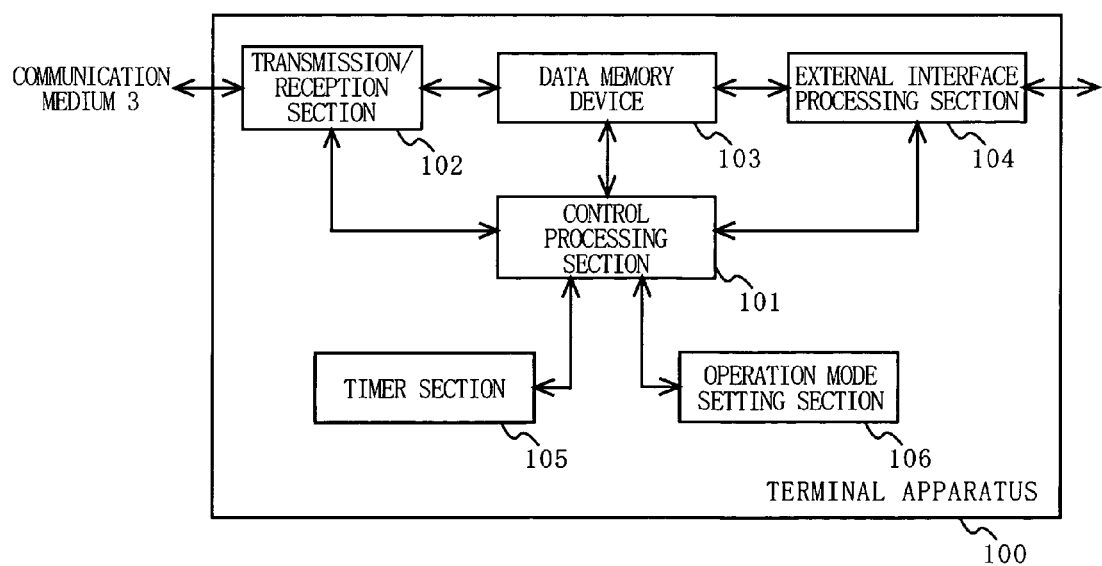
FIG. 2 is a block diagram illustrating a functional structure of the terminal apparatus 100.

FIG. 2 is a block diagram illustrating a functional structure of the terminal apparatus 100. In FIG. 2, the terminal apparatus 100 comprises a control processing section 101, a transmission/reception section 102, a data memory device 103, an external interface processing section 104, a timer section 105, and an operation mode setting section 106.

The control processing section 101 controls an operation of the whole terminal apparatus 100. The control processing section 101 includes a computation apparatus or the like.

The transmission/reception section 102 transmits and receives a frame via the communication medium 3. The transmission/reception section 102 includes a filter for extracting only a communication band, or the like.

The data memory device 103 is an apparatus which has a memory area capable of holding data. The data memory device 103 is used as a computation temporary area. The data memory device 103 also stores dynamic network information, terminal information, a network identifier, or the like. The data memory device 103 also stores software in which an operation of the control processing section 101 is described, terminal-specific terminal identification information, user identification information, or the like. By executing the software stored in the data memory device 103, the control processing section 101 executes a process described below to control an operation of the whole terminal apparatus 100.

The external interface processing section 104 interfaces with other protocol network(s), such as an upper network hierarchical layer as a host terminal; Ethernet (registered trademark) when implemented in a form such that a terminal is provided with a bridge function; radio wave; a coaxial line; a telephone line, and the like.

The timer section 105 counts time.

Each terminal apparatus 100 can operate as a control terminal which controls opportunity(s) of access of other terminal apparatus(es) 100 to the communication medium 3, or as a controlled terminal whose opportunity of access to the communication medium 3 is controlled by another terminal apparatus operating as a control terminal. When a terminal apparatus 100 operates as a control terminal, the terminal apparatus 100 is in a mode called a control terminal mode. When a terminal apparatus 100 operates as a controlled terminal, the terminal apparatus 100 is in a mode called a controlled terminal mode. The operation mode setting section 106 sets whether a terminal apparatus 100 currently operates in the control terminal mode or the controlled terminal mode.

Figure 3:
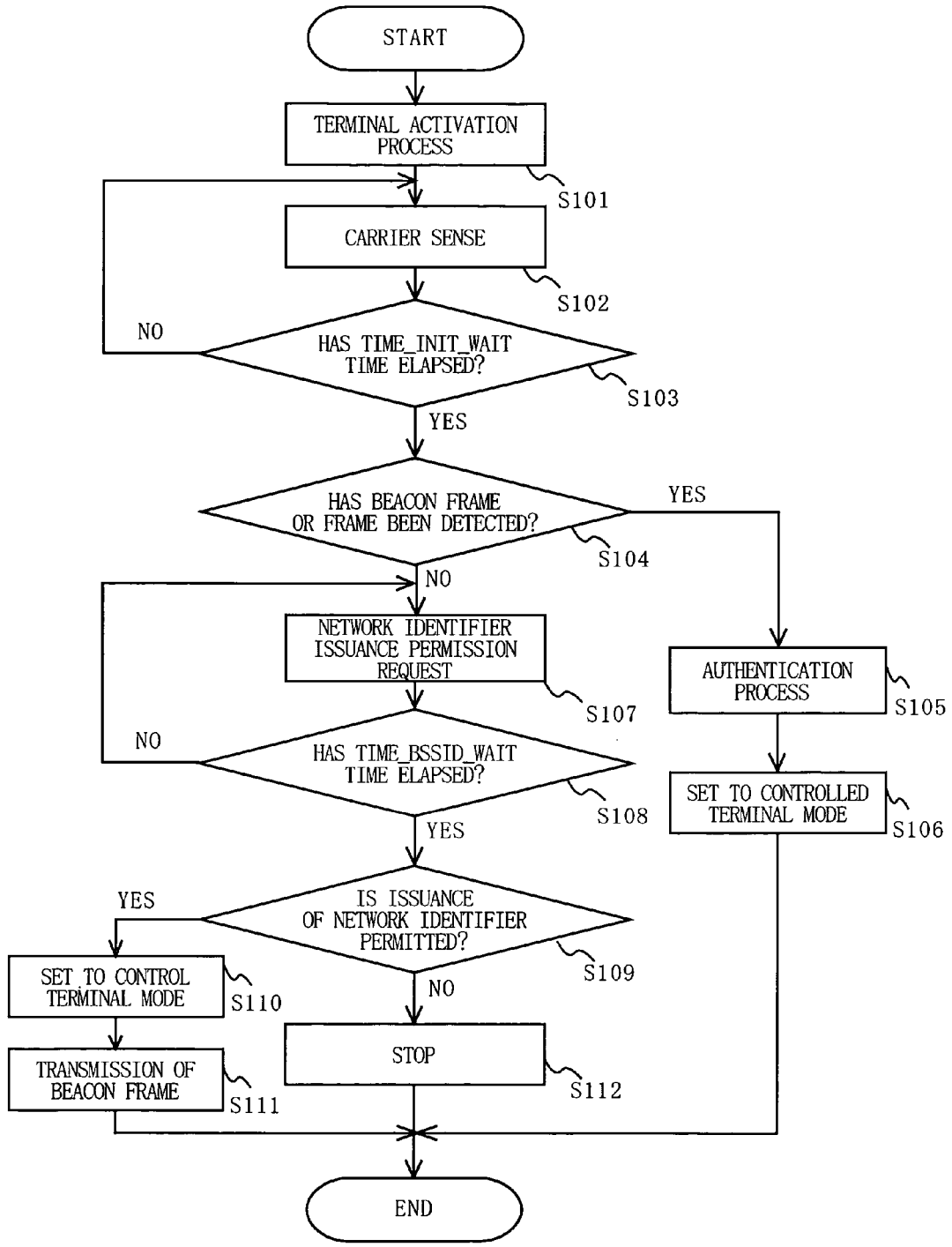
FIG. 3 is a flowchart illustrating a process of the terminal apparatus 100 immediately after activation (powered on after connection of a network) thereof.

FIG. 3 is a flowchart illustrating a process of the terminal apparatus 100 immediately after activation thereof. Hereinafter, an operation of the terminal apparatus 100 immediately after activation thereof will be described with reference to FIG. 3. Note that, in the first embodiment, a control terminal periodically performs broadcast transmission of a frame containing information for a medium access control (hereinafter referred to as a beacon frame) in order to provide opportunity(s) of medium access of controlled terminal(s). A logical network created in the first embodiment is specified with a network identifier (also referred to as a BSSID).

When a power source of a terminal apparatus 100 is turned on, the control processing section 101 of the terminal apparatus 100 executes a process required for activation (step Next, the control processing section 101 executes a carrier sense process to try to detect existing communication (step S102). Next, the control processing section 101 references the timer section 105 to determine whether or not a predetermined time (TIME_INIT_WAIT time) has elapsed since the activation (step S103). In the first embodiment, the control terminal is supposed to periodically transmit a beacon frame, and therefore, the TIME_INIT_WAIT time is set to be longer than a cycle during which a beacon frame is transmitted. Thereby, if there is another terminal apparatus 100 which has been activated and can communicate with a newly activated terminal apparatus 100, the newly activated terminal apparatus 100 can detect at least a beacon frame during carrier sense.

In step S103, when the TIME_INIT_WAIT time has not elapsed, the control processing section 101 returns to the operation of step S102. On the other hand, when the TIME_INIT_WAIT time has elapsed, the control processing section 101 goes to an operation of step S104. Note that, when having received a beacon frame or a frame once in step S103, the control processing section 101 may go to step S104 without waiting for an elapse of the TIME_INIT_WAIT time.

In step S104, the control processing section 101 determines whether or not a beacon frame or another frame has been detected during carrier sense. When the result of the determination is positive (YES), the control processing section 101 goes to an operation of step S105. On the other hand, when the result of the determination is negative (NO), the control processing section 101 goes to an operation of step S107.

In step S105, the control processing section 101 is subjected to an authentication process for participating in a logical network to which a terminal apparatus which has issued the detected frame (including a beacon frame) belongs. Next, the control processing section 101 sets the operation mode setting section 106 to operate as a controlled terminal (step S106). Note that the control processing section 101 may subjectively determine whether or not it has a right to participate in the logical network, and when determining that it has no right of participation, may end the operation without being subjected to the authentication process. In other words, when a terminal apparatus has any means of previously managing a network identifier(s) in which it can participate, the control processing section 101 thereof may not needlessly request authentication for a network in which it cannot participate. Alternatively, the control processing section 101 may subjectively determine whether or not it wishes to participate in the logical network, and when it does not wish, may end the operation without being subjected to the authentication process. In other words, when wishing to participate in the logical network, a terminal apparatus determines whether or not to participate in the logical network based on any information (e.g., a security level description area) described in a frame header of a beacon frame issued on the network, or a general data frame. With these methods, the control processing section 101 can subjectively determine, by itself, whether or not to participate in a logical network without being subjected to the authentication process, thereby making it possible to, for example, establish a security function. For example, the control processing section 101 compares a security level required by contents handled by itself with a security level supported by the logical network to determine whether or not to participate in the logical network, thereby making it possible to avoid from participating a logical network having a low security level.

Here, support of a security level by a network and a terminal will be described in more detail. FIG. 4 is a diagram illustrating exemplary security levels. It is, for example, assumed that the security levels of FIG. 4 are defined on a user management network. The security level may include, for example, an operational level which is set for each terminal apparatus, depending on an implemented state of the terminal apparatus, and a request level which is set by an external request based on the content type of transfer request or the like. It is assumed that the security levels are separately managed. It is also assumed that, when authentication is requested, an operational level and a request level set in a terminal are described in an authentication request frame issued in step S105.

Figure 5:
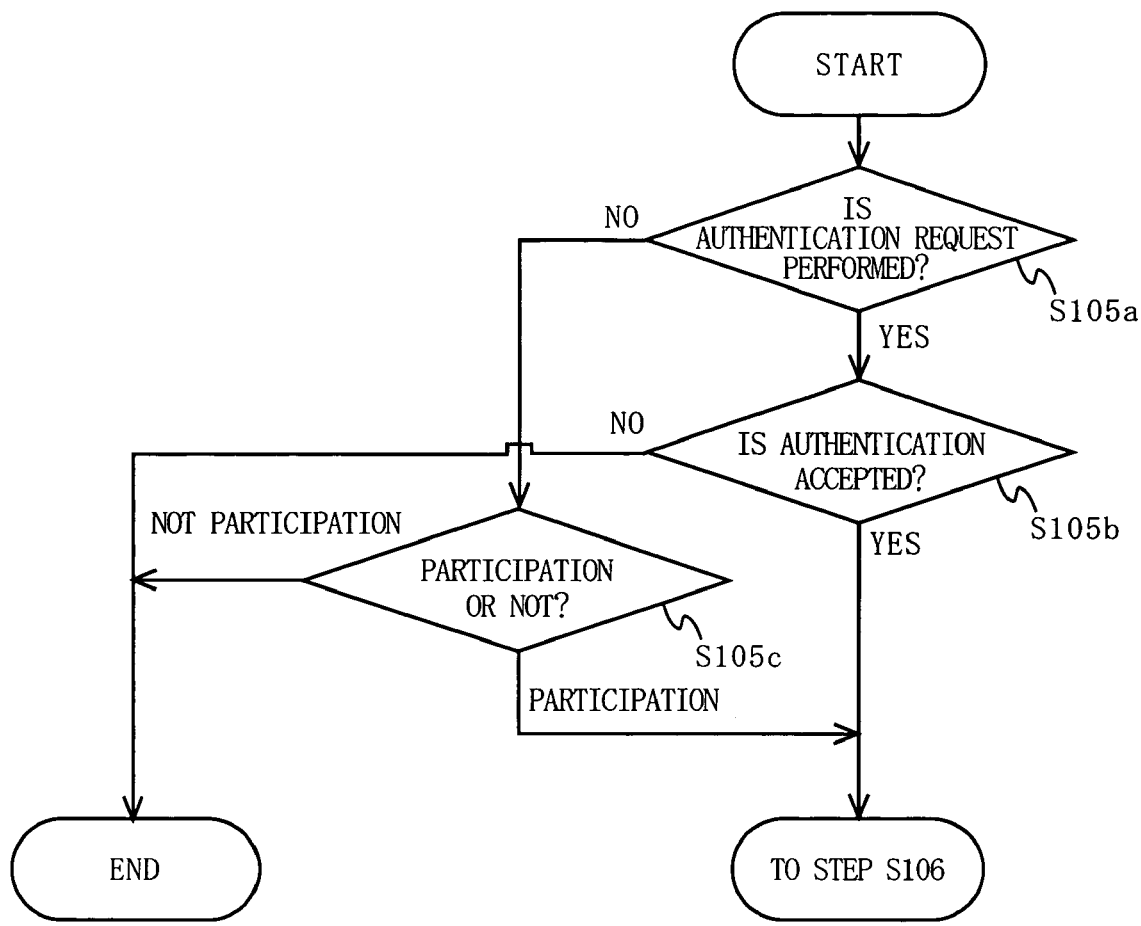
FIG. 5 is a flowchart illustrating exemplary details of the authentication process in step S105.

FIG. 5 is a flowchart illustrating exemplary details of the authentication process in step S105. In FIG. 5, the control processing section 101 compares a security level on which a network described in the beacon frame or the frame detected in step S104 is operated, with a security level set in itself, to determine whether or not to perform an authentication request (step S105a). For example, when the security level of the network is higher than the operational level of the control processing section 101, the control processing section 101 determines not to issue an authentication request. Note that, when the security level of the network is lower than the request level, the control processing section 101 may determine not to issue an authentication request. Here, a terminal which has not issued an authentication request, may inform a connection application of the reason why the terminal does not participate in the network.

When an authentication process is not required in step S105a, the control processing section 101 transmits an authentication request to a control terminal, and determines whether or not the authentication request has been accepted (step S105b). The control terminal interprets a security level set in the authentication request terminal, and determines whether or not to accept the authentication request. When the authentication request has been accepted, the control processing section 101 goes to the operation of step S106. On the other hand, when the authentication request has not been accepted, the control processing section 101 ends the process. For example, an operational level described in an authentication request frame is lower than, or does not correspond to, a security level on which the network is currently operated, the control terminal does not accept the authentication request. Here, the terminal whose authentication request has been refused may inform a connection application of the reason why the authentication request has been refused.

In step S105a, when an authentication process is not required, the control processing section 101 determines whether or not to participate in the network (step S105c). When the control processing section 101 is to participate in the network, the control processing section 101 goes to the operation of step S106. On the other hand, when the control processing section 101 is not to participate in the network, the control processing section 101 ends the process.

In step S107, the control processing section 101 requests a user, a BSSID management section in the terminal, or a BSSID management terminal connected to the network, or the like, to issue a network identifier. Next, the control processing section 101 references the timer section 105 to determine whether or not a predetermined time (TIME_BSSID_WAIT time) for requesting permission of issuance of a network identifier has elapsed (step S108). When the TIME_BSSID_WAIT time has not elapsed, the control processing section 101 returns to the operation of step S107. On the other hand, when the TIME_BSSID_WAIT time has elapsed, the control processing section 101 goes to an operation of step S109.

Note that the BSSID management terminal may use the security level (an operational level, a request level, etc.) of a terminal requesting a network identifier as a criterion of permission of issuance of the network identifier.

In step S109, the control processing section 101 determines whether or not the issuance of the network identifier is permitted. When the issuance of the network identifier is permitted, the control processing section 101 recognizes that it should operate in the control terminal mode, and sets the operation mode setting section 106 so that the control processing section 101 operates as a control terminal (step S110). Next, the control processing section 101 generates a beacon frame, and causes the transmission/reception section 102 to perform broadcast transmission of the beacon frame onto the communication medium 3 (step S111). In this case, a security level on which the network is operated may be an operational level, a request level, or the like which is set in the terminal apparatus, or a level designated by a BSSID issuing terminal in step S107.

On the other hand, when the issuance of BSSID is not permitted, the control processing section 101 is stopped (step S112). Note that the control processing section 101 may return to the operation of step S101 after step S112.

Note that, concerning the process of issuance of BSSID, a BSSID issuing terminal may not be necessarily present. When a beacon frame or a frame has not been detected in step S104, the control processing section 101 may go to the operation of step S110, set the control terminal mode, and transmit a beacon frame.

Note that the setting and criterion for security may not be provided.

As described above, by executing the process of FIG. 3, a terminal apparatus of the user management network 1 can determine whether or not to operate as a control terminal or a controlled terminal after activation. Thereby, it is possible to considerably easily start to use a network without a task required for the user, which is significantly beneficial for the user.

Figure 6:
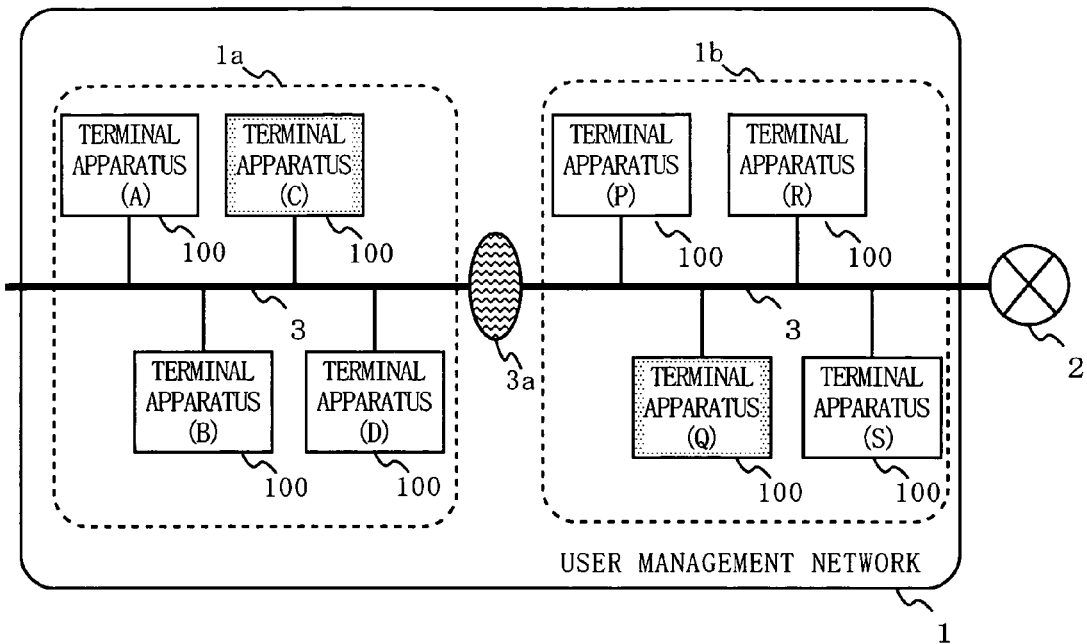
FIG. 6 is a diagram for explaining that, when a terminal apparatus 100 is activated with the process of FIG. 3, a plurality of logical networks 1a and 1b are created within a single user management network 1.

A description will be given of the case where a plurality of logical networks are created within the single user management network 1 when a terminal apparatus 100 is activated with the process of FIG. 3. FIG. 6 is a diagram for explaining that, when a terminal apparatus 100 is activated with the process of FIG. 3, a plurality of logical networks 1*a* and 1*b* are created within the single user management network 1. In FIG. 6, terminal apparatuses are designated with A, B, C, D, P, Q, R, and S in parentheses to make distinction therebetween.

In FIG. 6, it is assumed that the terminal apparatus C is activated. The terminal apparatus C is assumed to become a control terminal for the logical network 1*a* in accordance with the process of FIG. 3, and periodically issue a beacon frame. It is also assumed that the terminal apparatuses A, B, and D are subsequently activated. Thereafter, the terminal apparatuses A, B, and D each detect a beacon frame issued by the terminal apparatus C and become a controlled terminal in accordance with the process of FIG. 3.

Here, as illustrated in FIG. 6, it is assumed that a failure 3*a* which interferes with transmission occurs on the communication medium 3. For example, assuming that the communication medium 3 is a power line, the failure 3*a* occurs when an appliance which generates locally large noise with respect to a band used in power line communication is connected in the vicinity of the power line. Note that the failure 3*a* includes the case where a frame does not eventually reach due to a wiring structure, a physical distance, or the like of a power line.

It is here assumed that the terminal apparatus Q is activated in the situation that the failure 3*a* occurs. In this case, since the failure 3*a* occurs, the terminal apparatus Q cannot detect a frame issued within the logical network 1*a*. Therefore, in accordance with the process of FIG. 3, the terminal apparatus Q itself becomes a control terminal for the logical network 1*b*, and periodically issued a beacon frame. Thereafter, the terminal apparatuses P, R, and S are activated, and become controlled terminals on the logical network 1*b*. Thus, as illustrated in FIG. 6, the logical networks 1*a* and 1*b* are created within the user management network 1.

Figure 7:
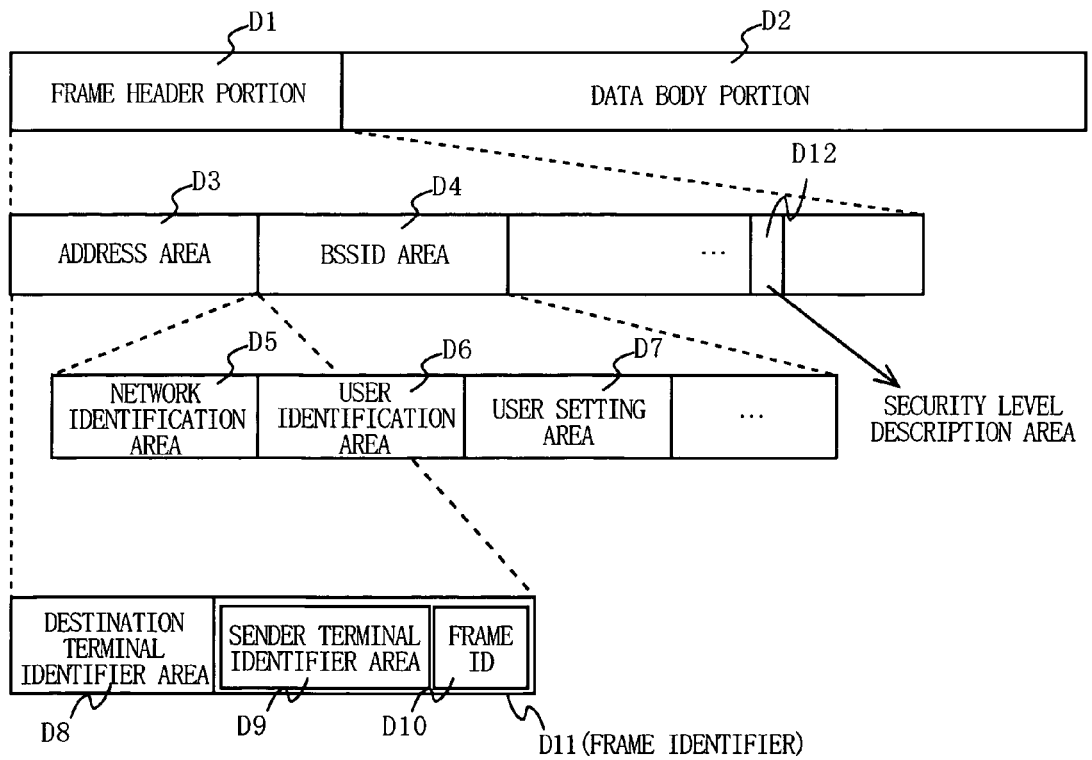
FIG. 7 is a diagram illustrating an exemplary format structure of a frame.

Here, a format of a frame issued by each terminal apparatus 100 will be described. FIG. 7 is a diagram illustrating an exemplary format structure of a frame in the first embodiment.

In FIG. 7, a frame is composed of a frame header portion D1 and a data body portion D2.

The frame header portion D1 includes an address area D3, a BSSID area D4, and a security level description area D12.

The address area D3 is an area which stores terminal identification information for identifying terminal apparatuses, such as a frame sender, a frame receiver, a frame relay station, a frame relay destination, and the like. The address area D3 includes a destination terminal identifier area D8 and a frame identifier D11. The frame identifier D11 has a sender terminal identifier area D9 and a frame ID D10.

The BSSID area D4 includes a network identification area D5, a user identification area D6, and a user setting area D7.

The network identification area D5 is an area which stores a network identifier for identifying a logical network to which a terminal apparatus transmitting the frame belongs. As the network identifier, for example, the MAC address of a terminal apparatus which first becomes a control terminal, a system timer obtained when issuance of a network identifier is permitted in step S108 of FIG. 3, a program counter, a parameter generated based on the system timer and the program counter, or the like is used. Note that the network identifier is not limited to these as long as it can be used to uniquely identify a logical network.

The user identification area D6 is an area which stores a user identifier for identifying a user. As the user identifier, for example, a parameter provided by a vender, a parameter uniquely determined from a telephone number, an address, or the like, a parameter set by a user, or the like is used. The Identifiers stored in the user identification area D6 are in one-to-one correspondence with user management networks 1. Therefore, a set identified by a plurality of network identifiers may be present in a set identified by a single user identifier.

The user setting area D7 is an area which is prepared so that a user intentionally sets a network structure, and is used to arbitrarily set and construct a sub-network in a set identified by a user identifier. For example, a group identifier corresponding to VLAN-TAG defined in Ethernet (registered trademark) is introduced into the user setting area D7. Thereby, a user can intentionally group terminal apparatuses to section a logical network.

The destination terminal identifier area D8 is an area which indicates an identifier for a terminal apparatus which is a destination of a frame. The sender terminal identifier area D9 is an area which indicates an identifier for a terminal apparatus which is a sender of a frame. The frame ID D10 is a frame identifier. The security level description area D12 is an area in which a security level is described.

In the example of FIG. 6, the logical networks 1*a* and 1*b* are under a control of the same user, i.e., are formed in the same user management network 1. Therefore, a user identifier contained in a frame transmitted or received by a terminal apparatus 100 of the logical network 1*a* is the same as a user identifier contained in a frame transmitted or received by a terminal apparatus 100 of the logical network 1*b*. However, a network identifier contained in a frame transmitted or received by a terminal apparatus 100 of the logical network 1*a* is different from a network identifier contained in a frame transmitted or received by a terminal apparatus 100 of the logical network 1b. Thus, by differentiating network identifiers, logical networks to which frames belong are distinguished from each other.

Figure 8:
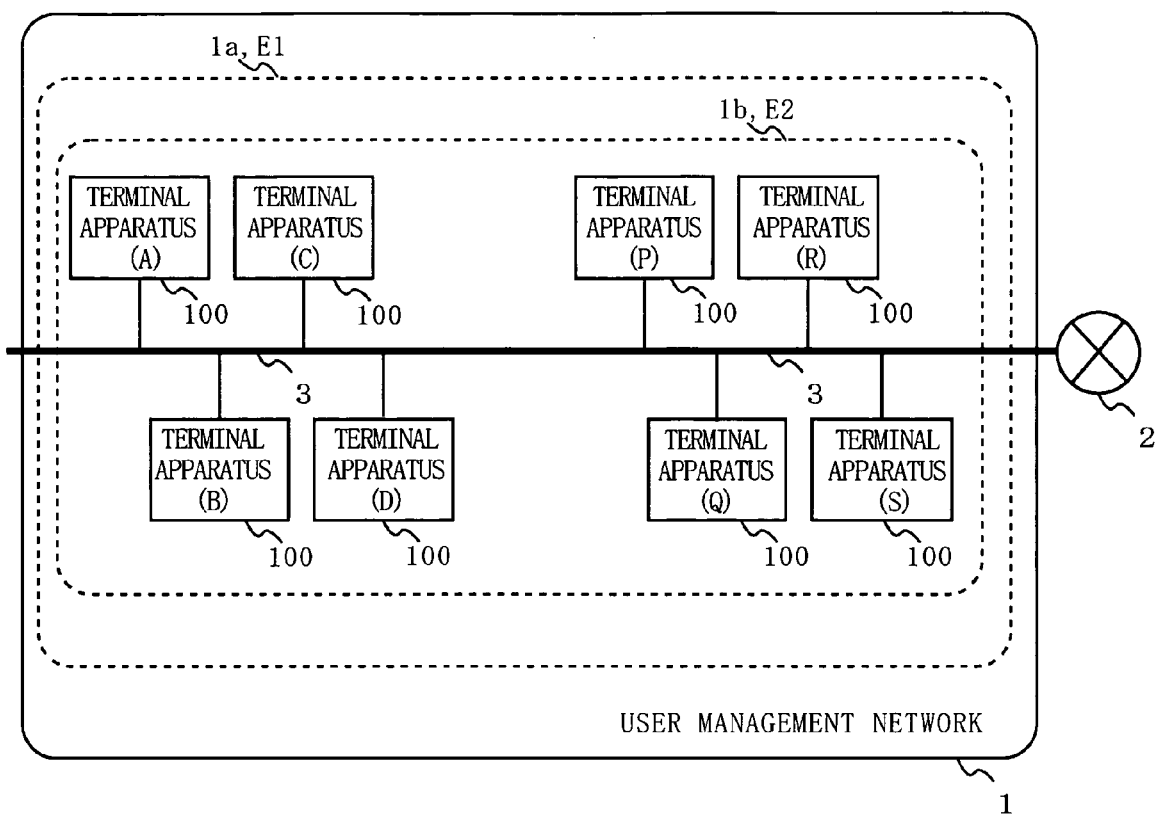
FIG. 8 is a diagram for explaining an operation of a terminal apparatus 100 when a failure 3a is eliminated.

Next, it is assumed that the failure 3a of FIG. 6 is eliminated, so that the communication medium 3 has a transmission channel having a state that a failure is not present. FIG. 8 is a diagram for explaining an operation of a terminal apparatus 100 when the failure 3a is eliminated.

When the failure 3a is assumed to be eliminated, a frame of a terminal apparatus 100 belonging to the logical network 1a can reach a range E1. Similarly, a frame of a terminal apparatus 100 belonging to the logical network 1b can reach a range E2. As illustrated in FIG. 8, when the failure 3a is eliminated, a range which a frame of a terminal apparatus 100 belonging to each logical network can reach is expanded. In addition, since control terminals transmit a beacon frame independently in the logical networks 1a and 1b, there is a possibility that the expansion of the ranges which a frame can reach leads to occurrence of frame collision. Therefore, in order to avoid occurrence of the collision, a certain arbitration (interference avoidance arbitration) needs to be performed between the logical networks 1a and 1b, or the logical networks 1a and 1b need to be unified.

When a communication protocol which cannot detect collision is used, an arbitration method (the TDMA method described above, etc.) is often used to perform arbitration in order to avoid occurrence of collision, in which a time during which a communication medium is occupied is allocated for each terminal apparatus, and each terminal apparatus transmits a frame without carrier sense. If the logical networks 1a and 1b should not be unified in the situation of FIG. 8, the TDMA method or the like should be used to perform arbitration in order to avoid occurrence of collision.

For example, when a power line is used as the communication medium 3, there may be the case where two logical networks which are physically connected via the same power line should not be unified (e.g., interference between neighboring houses). This is because if a control terminal of one house controls a terminal of the other house, there occurs a lack of economical equality, a lack of privacy, or a lack of content protection, leading to requirement of a security function. In order to achieve the security function, it is necessary to introduce complicated authentication, an encryption key exchange process, and the like.

The present invention relates to a method of unifying logical networks. Therefore, the above-described method of performing arbitration to avoid occurrence of collision without unifying logical networks will not be further explained.

In the first embodiment, the logical networks 1a and 1b are assumed to be formed within the same user management network 1. Therefore, the logical networks 1a and 1b should be unified if the user dare not logically distinguish them from each other.

Figure 9:
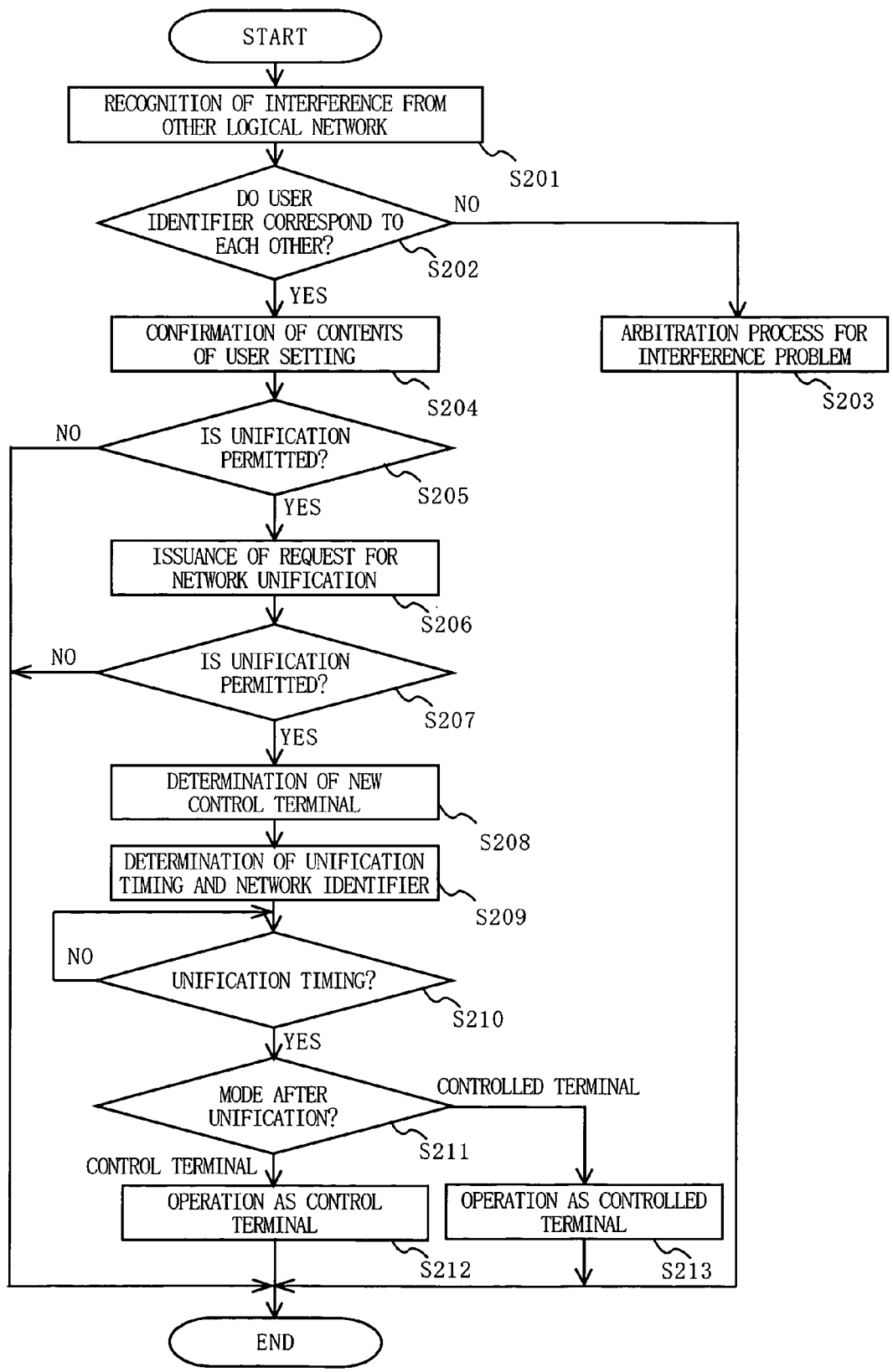
FIG. 9 is a flowchart illustrating an operation of a control terminal when logical networks are unified.

FIG. 9 is a flowchart illustrating an operation of a control terminal when logical networks are unified. Hereinafter, the operation of a control terminal when logical networks are unified will be described with reference to FIG. 9.

Each controlled terminal, when a network identifier contained in a received frame is different from the network identifier of a logical network to which the terminal belongs, informs a control terminal of the logical network to which the terminal belongs that the terminal has received the frame containing a network identifier different from the network identifier of the logical network to which the terminal belongs. Specifically, each controlled terminal stores a frame received by the transmission/reception section 102 into the data memory device 103. The control processing section 101 of the controlled terminal references the frame header portion D1 of the frame stored in the data memory device 103. If the result of the referencing shows that the frame is a general data frame, the control processing section 101 of the controlled terminal transfers the frame to the external interface processing section 104, and causes the external interface processing section 104 to perform a process, such as bridging or the like. Thereafter, if the result of referencing the frame header portion D1 shows that the network identifier is different from that of the logical network to which the controlled terminal belongs, the control processing section 101 of the controlled terminal causes the transmission/reception section 102 to transmit that information to the control terminal. When the information is transmitted, the control processing section 101 of the controlled terminal also informs the control terminal of information of the BSSID area D4 contained in the frame.

The control processing section 101 of the control terminal recognizes other logical network(s) and starts an operation, when triggered by the information that the network identifier is different from that of the logical network to which the controlled terminal belongs has been received from the controlled terminal, or when detecting that a network identifier contained in a frame received by the control terminal is different from that of a logical network to which the control terminal belongs (step S201). Thus, when the operation mode setting section 106 defines that a terminal should operate as a control terminal, the control processing section 101 receives, from the controlled terminal, information that there is interference from a logical network other than that which is to be controlled. In other words, the control processing section 101 has a function as an interference detecting section of detecting interference from a logical network other than the logical network to which the controlled terminal belongs (i.e., detecting a difference between the network identifiers), no matter whether the operation mode setting section 106 sets the control terminal mode or the controlled terminal mode. In the controlled terminal mode, the control processing section 101 has a function to inform a control terminal of interference information. The control processing section 101 has a function to receive interference information informed from a controlled terminal. Therefore, when the operation mode setting section 106 sets that a terminal apparatus operates as a control terminal, the control processing section 101 has a function as an interference recognizing section for recognizing interference from at least one logical network other than a logical network to be controlled. Note that the interference information as used herein may be information contained in the address area D3 or the BSSID area D4 of a received interference packet. Note that, in step S201, interference may not be detected from other logical network(s), depending on a communication protocol used. A method of certainly detecting interference from other logical network(s) will be described below and elsewhere herein.

Next, the control processing section 101 of the control terminal determines whether or not a user identifier contained in the received BSSID area D4 corresponds to a user identifier of a user management network 1 to which the control terminal belongs, or whether or not a user identifier contained in a received frame corresponds to a user identifier of a user management network 1 to which the control terminal belongs (step S202).

When the user identifiers do not correspond to each other, the control processing section 101 of the control terminal determines that there is an interference problem between logical networks, and performs arbitration with respect to the external logical network (step S203). For example, the control processing section 101 of the control terminal transmits an interference informing frame stored in the data memory device 103 to a control terminal on the external logical network.

On the other hand, when the user identifiers corresponds to each other, i.e., a logical network to be controlled and the other logical network(s) are under management of the same user, the control processing section 101 of the control terminal references the user setting area D7 contained in the received BSSID area D4 to confirm a setting of the logical network to which the control terminal belongs (step S204). The user setting area D4 explicitly contains information concerning a setting of a logical network which is stored therein by the user. Examples of the information concerning a setting of a logical network include information about permission of unification of logical networks, network identification information about a logical network in which only a previously registered terminal apparatus can participate.

The control processing section 101 of the control terminal determines, based on contents confirmed in step S204, whether or not unification of logical networks is permitted by the user (step S205). When unification of logical networks is not permitted, the control processing section 101 of the control terminal ends the process. On the other hand, when unification of logical networks is permitted by the user, the control processing section 101 of the control terminal goes to an operation of step S206.

A user identifier may be recorded into a non-volatile memory area included in the data memory device 103 by a user, a terminal dealer, a vender, or the like. The user identifier may have contents, such as an address and a telephone number of the user, a parameter issued by a vender, a code uniquely generated from an arbitrary parameter or the like by the user (hereinafter referred to as a user identification code), or the like, as described above. This value maybe set and rewritten using a user interface (e.g., a personal computer connected to the external interface processing section 104), a user interface included in the terminal apparatus itself, or a user interface which can be connected to a transmission/reception section, when the terminal apparatus is set up. Alternatively, this value may be set by, for example, locally connecting terminal apparatuses together with a certain method, and the user, the dealer of the terminal apparatus, or the vender performing a predetermined operation. The same user identification code may be automatically set in the non-volatile memory area included in the data memory device 103 of each terminal apparatus. The memory area for the user identification code included in the data memory device 103 may be referenced when a certain frame is issued. The user identification code is copied into a user identification area (D6) of a frame header portion. The user identification code may be changed as long as the above-described operation is not performed.

The user identifier may be recorded into the non-volatile memory area of the data memory device 103 by the user, the terminal dealer, the vender, or the like.

Contents described in the user setting area may be a code generated as a result of an operation performed by the user when wishing to intentionally set a logical structure of a network (hereinafter referred to as a user set code) as described above. This value may be set and rewritten using a user interface (e.g., a personal computer connected to the external interface processing section 104), a user interface included in the terminal apparatus itself, or a user interface which can be connected to a transmission/reception section, when the terminal apparatus is set up. Alternatively, this value may be set by, for example, locally connecting terminal apparatuses together with a certain method, and the user, the dealer of the terminal apparatus, or the vender performing a predetermined operation. The same user identification code may be automatically set in the non-volatile memory area included in the data memory device 103 of each terminal apparatus. The memory area for the user identification code included in the data memory device 103 may be referenced when a certain frame is issued. The user identification code is copied into a user identification area (D7) of a frame header portion. The user set code stored in the user setting area may contain information concerning an ID for each logical network, whether or not unification of logical networks is permitted, or the like. Note that, only when a user set code contained in a received frame corresponds to a user set code of a terminal stored in its own data memory device 103, the control processing section 101 of the terminal apparatus may determine that a reception process is to be performed. Thereby, when receiving a frame having a different user set code, the control processing section 101 does not need to perform a process after reception. For example, when receiving a frame having a different user set code, the control processing section 101 does not need to comply with the contents of a beacon frame.

Note that a default code based on a predetermined policy which does not hinder an ordinary-level operation may be set as a user identification code and/or a user set code in the terminal apparatus. In this case, when the user identification code and/or the user set code are not explicitly set, the terminal apparatus may use the default code.

In step S206, the control processing section 101 of the control terminal generates a unification request frame with respect to a logical network to be unified, and causes the transmission/reception section 102 to transmit the frame. In this case, at the same time, the control processing section 101 of the control terminal activates and sets the timer section 105 to have a certain expiration value, and waits for a response with respect to the unification request frame. With respect to the unification request frame, other terminal apparatus (es) of other logical network(s) determine whether or not logical network unification is permitted, and informs the control terminal of a response indicating whether or not unification is permitted. It is determined whether or not unification is permitted, in accordance with a logical network structure policy previously set by a user. For example, it may be defined that unification is not permitted even when a security policy of a network does not permit a change in an encryption key. Note that, when a control terminal and other control terminal(s) cannot perform direct communication, the control terminal may perform relay transmission of a unification request frame to other control terminal(s) via a controlled terminal which has informed the control terminal of interference information.

Next, the control processing section 101 of the control terminal determines whether or not the response with respect to the unification request frame is permission of logical network unification (step S207). When logical network unification is not permitted, the control processing section 101 of the control terminal ends the process. On the other hand, when logical network unification is permitted, the control processing section 101 of the control terminal goes to an operation of step S208. Note that, also when the expiration value of the timer section 105 is satisfied, the control processing section 101 of the control terminal ends the process. As can be seen from steps S205 to S207, the control processing section 101 has a function as a unification determining section of determining whether or not to unify a logical network to be controlled with other logical network(s) when detecting interference from the other logical network.

Steps S202, S204 to S205, and S206 to S207 constitute a process for determining whether or not the logical networks are to be unified.

In steps S202, S204 to S205, and S206 to S207, when the logical networks are to be unified, the control processing section 101 of the control terminal exchanges information for unifying the logical networks (hereinafter referred to as network information), with a control terminal of the other logical network to determine whether or not the current control terminal or a control terminal of the other logical network will operate as a new control terminal of the newly created logical network (step S208). Next, the control processing section 101 of the control terminal determines timing of unification and a network identifier after unification (step S209). Note that it may be determined which control terminal is used as a control terminal after unification, based on information concerning whether or not a logical network unification request has been issued, the number of terminals participating in each logical network, traffic on each logical network, a total of bands of links performing band protection, priority set by a user, or the like. The network information may include an identifier of a terminal participating in a logical network, a terminal characteristic (contents of a setting, modulation of transfer data, etc.), a communication situation, information concerning an encryption key between links, information concerning band arbitration between protected links, characteristics of a transmission channel between each terminal, and the like. These pieces of information are collected by a control processing section and are stored in a data memory device.

Next, the control processing section 101 of the control terminal determines whether or not timing of unification determined in step S209 has arrived (step S210). When the unification timing has not arrived, the control processing section 101 of the control terminal returns to the operation of step S210. On the other hand, when the unification timing has arrived, the control processing section 101 of the control terminal determines whether an operation mode after unification is the control terminal mode or the controlled terminal mode (step S211). As can be seen from step S211, the control processing section 101 has a function as a new control terminal determining section of determining, when it is determined that a logical network to be controlled and other logical network(s) are to be unified, whether a control terminal of a logical network newly created by unification is the logical network to be controlled and the other logical network. In the case of the control terminal mode, the control processing section 101 of the control terminal instructs the operation mode setting section 106 to set that the control terminal is to continue to operate as a control terminal (step S212). In response to this, the operation mode setting section 106 sets that the current control terminal is to continue to operate as a control terminal for the newly created logical network. Thereafter, the terminal apparatus operates as a control terminal for the logical network after unification. A terminal apparatus which takes over a control terminal may optionally perform an operation for enabling network communication after unification by, for example, resetting an encryption key with timing of unification.

On the other hand, in the case of the controlled terminal mode, the control processing section 101 of the control terminal instructs the operation mode setting section 106 to set that the control terminal is to operate as a controlled terminal (step S213). In response to this, the operation mode setting section 106 sets that the current control terminal is to operate as a controlled terminal for the newly created logical network. Thereafter, the terminal apparatus operates as a controlled terminal for the logical network after unification.

Note that, when the terminal apparatus C which has been a control terminal changes its mode and operates as a controlled terminal, the terminal apparatus C may record information that "the terminal apparatus C has originally operated as a control terminal", and further, "control information held when the terminal apparatus C has operated as a control terminal", or the like, into the data memory device 103. These pieces of information are referenced when a control terminal is subsequently absent again and the terminal apparatus C needs to be activated as a control terminal again.

In this case, a terminal apparatus belonging to the logical network which has been controlled by the original control terminal which becomes a controlled terminal complies with a beacon frame issued by the new control terminal. Therefore, a frame can be transmitted and received within the newly unified logical network without interruption. Thereby, logical networks are unified, and a frame can be transmitted and received smoothly after unification.

Figure 10:
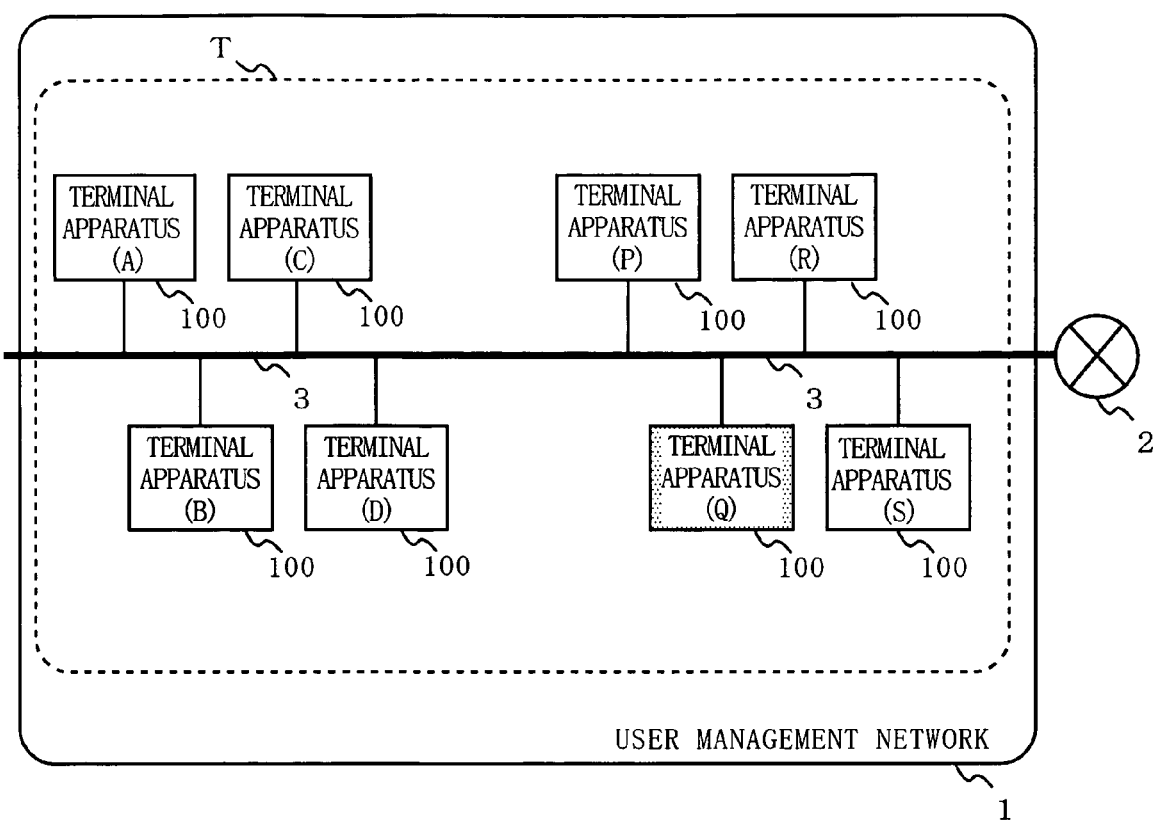
FIG. 10 is a diagram illustrating a structure of a whole logical network unified in accordance with the process of FIG. 9.

FIG. 10 is a diagram illustrating a structure of a whole logical network unified in accordance with the process of FIG. 9. As illustrated in FIG. 10, it is assumed that, after unification of the logical networks, the terminal apparatus Q is selected as a control terminal after unification.

The terminal apparatus C which has been a control terminal for the logical network 1a becomes a controlled terminal. In a system illustrated in FIG. 10, the user management network 1 and a logical network T correspond to each other, and a terminal apparatus of the user management network 1 is controlled by the single control terminal Q, resulting in expectation of an optimal centralized management of medium access. Note that, in the new logical network T, all terminal apparatuses which have belonged to the logical network 1a are equally handled by using the BSSID area D4 which has been used on the logical network 1b.

As described above, according to the first embodiment of the present invention, in a system in which a control terminal is automatically selected for operation of a centralized control type network to construct logical networks, a plurality of the constructed logical networks can be unified, depending on a situation. Therefore, when a plurality of logical networks are constructed more than necessary, the band resource of a transmission channel can be efficiently used. As a method of preventing creation of a plurality of logical networks, a certain manipulation may be requested to a user when logical networks are constructed, or a certain setting may be previously provided in a terminal apparatus, for example. However, any of these methods may impair the convenience or the degree of freedom of use for the user. However, in the present invention, when a plurality of logical networks are formed and interfere with each other, the validity of network unification is automatically determined and confirmed, and thereafter, networks are unified to centralize a medium access control. Therefore, it is possible to optimize the whole network without a task required for the user.

Note that, as described above, interference from other logical network(s) may not be detected in some cases. Therefore, it is preferable that a mechanism capable of detecting interference from other logical network(s) be provided within a terminal apparatus.

Figure 11:
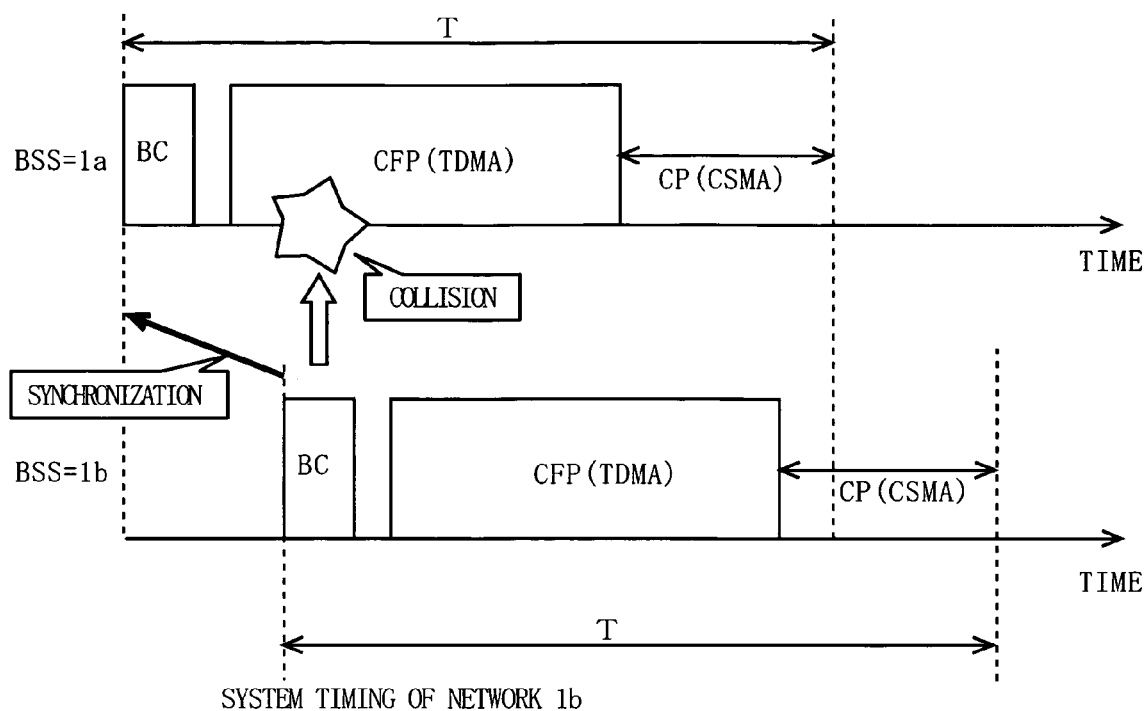
FIG. 11 is a diagram illustrating an exemplary timing chart when collision occurs in beacon frames.

Firstly, a description will be given of the case where interference from other logical network(s) cannot be detected. For example, it is assumed that the logical networks 1a and 1b each periodically issue a beacon frame, and have the same cycle of the beacon issuance. In this case, if timing of the logical network 1a issuing a beacon happens to coincide timing of the logical network 1b issuing a beacon when the state of FIG. 8 is established, there is a possibility that these beacon frames always collide each other to break down. FIG. 11 is a diagram illustrating an exemplary timing chart when collision occurs in beacon frames. For example, as illustrated in FIG. 11, if the timing of the logical network 1b issuing a beacon frame coincides steady frame issuance timing of the logical network 1a reserved in TDMA or the like, there is a possibility that beacon frames of the logical network 1b steadily collide each other to break down. Such a situation leads to a situation that the network system itself fails to function, particularly in a network protocol which defines an opportunity of medium access by interpreting a beacon frame. In such a situation, the control terminal cannot detect interference from other logical network(s), whereby the assumption of the operation of FIG. 9 is not satisfied.

Various methods for avoiding such a situation are considered.

For example, firstly, the interference detecting section of a control terminal may perform carrier sense before issuing a frame to investigate whether or not a preceding frame has been issued to a medium. Thereby, when a preceding frame has been issued, the control terminal can detect that there is interference from other logical network(s). Note that a frame as used herein may be a beacon frame or an ordinary frame.

Secondly, a control terminal may comprise a synchronization mechanism which is likely to avoid beacon collision by causing cycle start timing of a network to which the control terminal belongs to approach or coincide cycle start timing of the other network.

Thirdly, when a controlled terminal cannot detect a beacon frame issued by a control terminal, medium access may be permitted with a CSMA/CA method during a predetermined period of time after an elapse of a time during which a band is occupied, or medium access may be permitted with the CSMA/CA method for an entire segment (e.g., CFP and CP segments in FIG. 12), or medium access may be performed in accordance with contents of a beacon frame received at the latest. Thereby, if a beacon frame was not able to be received several consecutive times, medium access of a terminal apparatus within a network is not stopped. Thereby, the controlled terminal can detect interference from other logical network(s) and informs the control terminal of the result of detection.

Fourthly, the cycle of issuance of a beacon frame may be set to be a variety of values using a random algorithm or the like within a certain range. In this case, a control terminal changes the cycle of issuance of a beacon frame at random and transmits a beacon frame. A controlled terminal obtains the beacon frame issuance interval from information contained in the beacon frame. The beacon issuance interval is set to be within a predetermined time range. The controlled terminal can sets a limit of a period of time during which a band is occupied as a TDMA segment, and a time at which it is determined that a beacon frame cannot be detected. Thereby, beacon frame collision is avoided, whereby a control terminal and/or a controlled terminal can detect interference from other logical network(s).

Fifthly, a control terminal may set a slot for starting issuance of a beacon, and may shift a cycle of beacon issuance timing using a method, such as random backoff or the like. FIG. 12 is a diagram illustrating an exemplary timing chart when the beacon issuance start slot is set and the beacon issuance timing is shifted using random backoff. This case can be achieved even if a beacon frame interval is a constant cycle. Therefore, advantageously, it is easy to achieve a stable medium access control mechanism which guarantees constant transmission quality.

Here, a description will be given of the case where a network protocol is used which controls access of a terminal within a network to a medium using a beacon frame which is issued by a control terminal in constant cycles (hereinafter referred to as a network cycle; and a cycle start time is referred to as network timing). In this case, even if each terminal apparatus cannot receive a periodically issued beacon frame some consecutive times, the terminal apparatus is assumed to perform medium access in accordance with contents of a beacon frame received at the latest. An example in which, in the case of such a protocol, when a plurality of networks interfere with each other, an important frame, such as a beacon frame, is prevented from being broken down due to collision, will be described below. Note that a process described below achieves a mechanism which causes the starts of network cycles (network timings) to be close between adjacent networks (hereinafter referred to as a network synchronization mechanism). The process described below is operated independently and in parallel with a process involved in network unification or a process involved in changing of control terminals.

Figure 13:
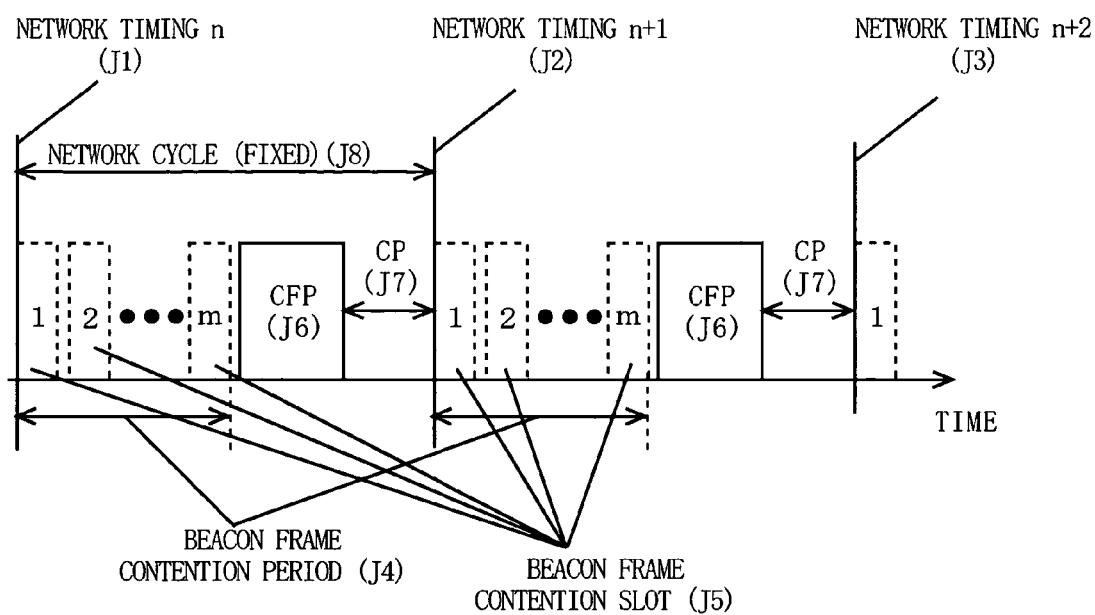
FIG. 13 is a diagram for explaining a network protocol in a network synchronization mechanism.

FIG. 13 is a diagram for explaining a network protocol in the network synchronization mechanism. A network cycle (J8) has a fixed length. FIG. 13 illustrates a time from a network timing n (J1) to a network timing n+2 (J3). A time segment in the network cycle (J8) is defined with a beacon frame contention period (J4) composed of m beacon frame contention slots (J5), a CFP (contention free period) (J6), and a contention period (J7).

The beacon frame contention slot defines a time during which timing of issuing a beacon by a control terminal is determined. The beacon frame contention slot is a unit which is determined based on a time during which it can be detected by carrier sense whether or not a frame has been issued onto a medium. A control terminal which issues a beacon frame performs random backoff in units of the beacon frame contention slot to issue a beacon frame. The beacon frame contention period (J4) is composed of m beacon frame contention slots (J5). However, at a time when issuing a beacon frame or detecting issuance of a beacon frame, a control terminal releases subsequent beacon frame contention slots (J5) The beacon frame contention period has a time of a maximum m beacon frame contention slots and is variable as described above.

The CFP (J6) is a contention free period for the TDMA access method, during which a control terminal receives a request from a terminal apparatus within a network, and frame issuance is occupied. The CFP (J6) has a defined maximum size, and can be changed, depending on a request from the terminal apparatus.

The CP (J7) is a contention period which is a time segment obtained by subtracting a time occupied by the beacon contention period (J4) and the CFP (J6) from the network cycle (J8). In CP (J7), each terminal apparatus uses the CSMA/CA method or the like to obtain an access right by contention. Note that a maximum size is defined for each of the beacon contention period (J4) and the CFP (J6), and therefore, the size of the CP (J7) is never zero or less.

By using the time scheduling of FIG. 13, the beacon frame issuance timing is limited to a certain range with respect to the network timing, and can be provided with randomness in units of the beacon frame contention slot. Specifically, even if networks having the same network cycle (J1) interfere with each other, it is possible to design to avoid a situation that either beacon frame is always broken down due to collision. Thereby, a certain logical network can detect the presence of other adjacent logical network(s).

Figure 14:
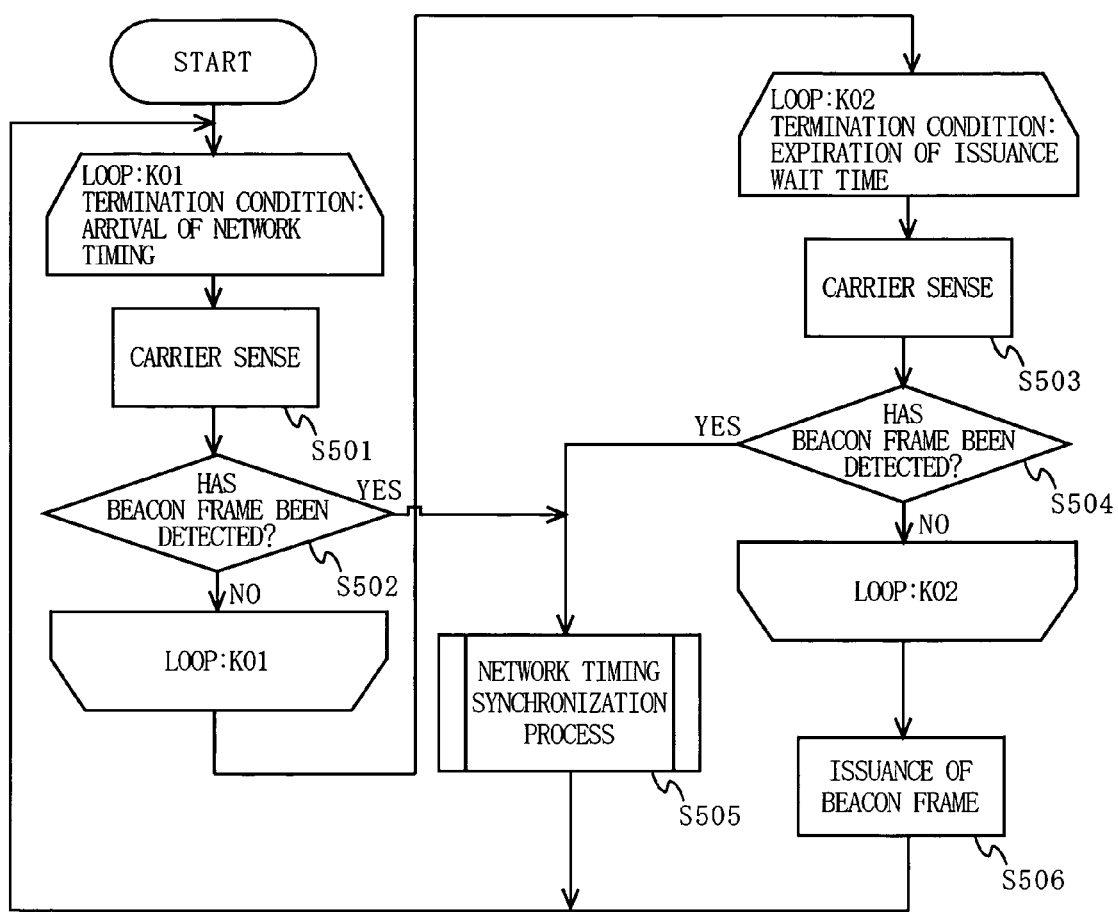
FIG. 14 is a flowchart illustrating an operation of a control terminal involved in issuance of a beacon frame.

FIG. 14 is a flowchart illustrating an operation of a control terminal involved in issuance of a beacon frame. Hereinafter, the operation of a control terminal involved in issuance of a beacon frame will be described with reference to FIG. 14.

A control terminal performs a loop (loop name: K01) where the termination condition is arrival of network timing (start time of a network cycle). In the loop K01, the control terminal performs carrier sense (step S501). Next, the control terminal determines, during the carrier sense of step S501, whether or not a beacon frame is detected (step S502). When a beacon frame is detected, the control terminal goes to an operation of step S505. On the other hand, when a beacon frame is not detected, the control terminal continues to perform the loop K01.

When the termination condition of the loop K01 is satisfied, the control terminal goes to an operation of an operation of a loop K02. A termination condition of the loop K02 is that an issuance wait time of random backoff is expired. In the loop K02, the issuance wait time of random backoff is determined as follows. At start of the loop K02, the control terminal performs random backoff to determine in which one of the beacon contention slots (J5) the issuance of a beacon frame is started. A time thus determined is the issuance wait time of random backoff.

In the loop K02, the control terminal performs carrier sense (step S503). Next, during the carrier sense of step S503, it is determined whether or not a beacon frame is detected (step S504). When a beacon frame is detected, the control terminal goes to the operation of step S505. On the other hand, when a beacon frame is not detected, the control terminal continues to perform the loop K02. Note that if a frame to be detected in steps S502 and/or S504 is a frame issued by a terminal belonging to another logical network, the frame may be other than a beacon frame. Note that it may be determined whether or not the frame is a frame issued by a terminal belonging to another logical network, with reference to the network identification area (D5) of the frame. When the termination condition of the loop K02 is satisfied, the control terminal issues a beacon frame (step S506), and returns to the operation of the loop K01.

Figure 15:
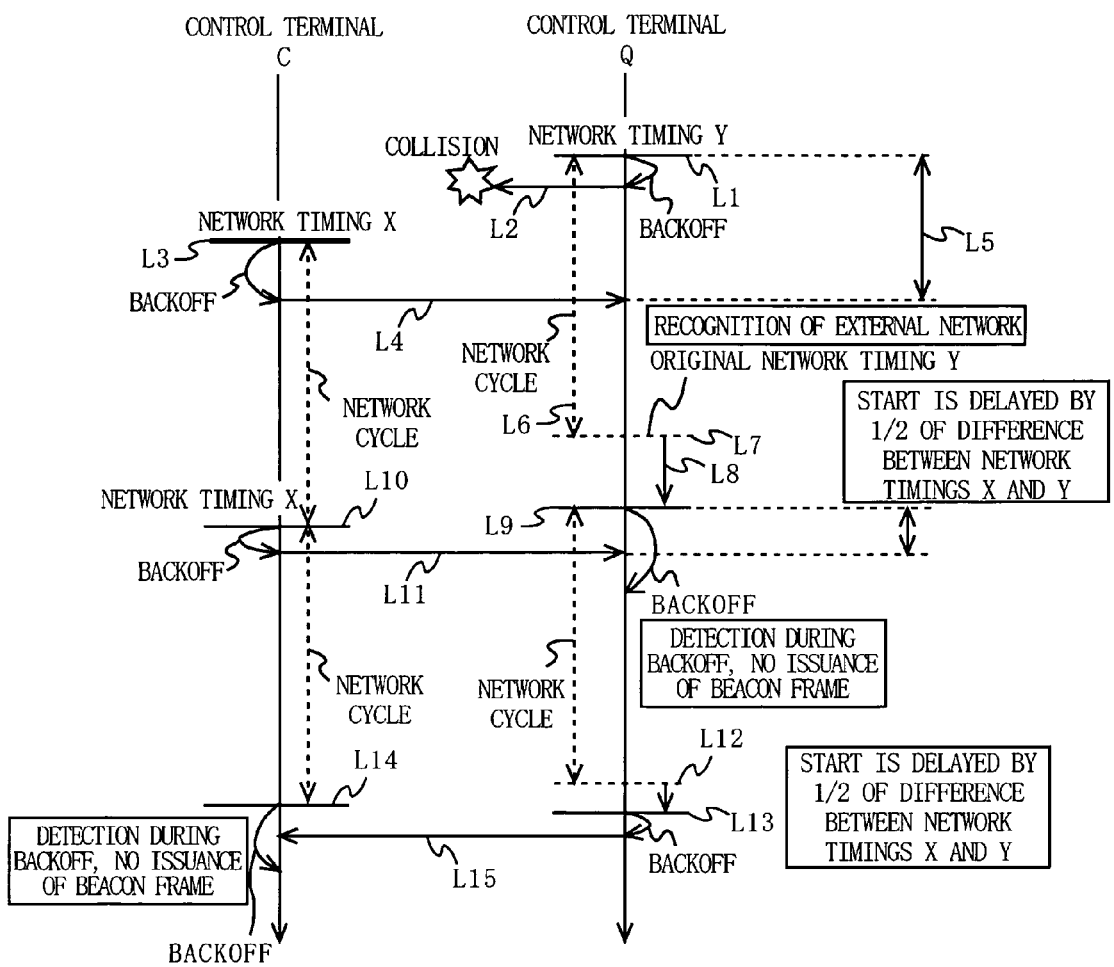
FIG. 15 is a sequence diagram illustrating an operation of each control terminal in a network timing synchronization process.

In step S505, the control terminal performs a synchronization process of network timing. FIG. 15 is a sequence diagram illustrating an operation of each control terminal in the network timing synchronization process. Hereinafter, the network timing synchronization process between the control terminal C and the control terminal Q will be described with reference to FIG. 15 for the understanding of an operation of each control terminal during the network timing synchronization process in step S505.

FIG. 15 illustrates an elapse of time from immediately after the failure 3a is eliminated and the state of FIG. 8 is provided. It is assumed that network timing X of the logical network 1a which is controlled by the control terminal C is placed at a location L3. On the other hand, network timing Y of the logical network 1b which is controlled by the control terminal Q is placed at a location L1.

The control terminal Q of the logical network 1b which first arrives at the network timing Y performs backoff to seek an opportunity of issuance of a beacon frame before issuing a beacon frame L2. In this case, however, it is assumed that, for example, a certain frame is issued on the logical network 1a and collision occurs, so that the beacon frame L2 does not reach the logical network 1a. Note that, in this case, there is a possibility that, among the terminal apparatuses (P, R, and S) belonging to the logical network 1b, a terminal apparatus which cannot interpret the beacon frame L2 due to collision is present. Such a terminal apparatus may have a function to comply with information contained in the latest beacon frame, thereby making it possible to perform ordinary medium access.

When L3 (the network timing X) arrives, the control terminal C of the logical network 1a issues a beacon frame L4 using a beacon frame backoff process. In this case, the beacon frame L4 is assumed to arrive at the logical network 1b. Note that the term "arrive" means not only that the beacon frame L4 directly arrives at the control terminal Q, but also that any of terminal apparatuses belonging to the logical network 1b informs the control terminal Q of the arrived information, whereby the control terminal Q knows the presence of an external network.

The control terminal Q which has recognized the presence of the logical network 1a extends the next network timing by ½ of a time difference (L5) between the network timing Y and timing of receiving the beacon frame L4. Specifically, in the logical network 1b, although the next network timing is originally placed at a location L7, the control terminal Q sets a location of timing L9 which is delayed by L8 which is ½ of L5, to be the network timing Y'. In this case, at the timing L7, the control terminal Q may issue a frame informing that the network timing is shifted, to a terminal apparatus of the logical network 1b. Further, medium access of the logical network 1b during the time L8 ranging from L7 (scheduled end time of the cycle) to the modified network timing Y' (L9) may be designated in a frame which informs that network timing is shifted. Thus, a series of operations from the detection of another logical network to the modification of network timing correspond to the process of step S505.

When coming to the modified network timing at L9, the control terminal Q performs an ordinary backoff process using L9 as a base point to seek an opportunity of issuance of a beacon frame. When coming to network timing at L10, the control terminal C of the logical network 1a performs backoff using L10 as a base point to issue a beacon frame L11. Here, it is assumed that issuance timing of the beacon frame L11 arrives during carrier sense by backoff of the control terminal Q. When another beacon frame L11 is received during carrier sense for issuance of a beacon frame, the control terminal Q stops issuance of a beacon frame. Note that, as in the above-described process, the control terminal Q also corrects the next network timing by delaying by ½ of a difference between a time at which the network timing L9 is received and a time at which the beacon frame L11 is received. In other words, when the network cycle whose base point is the network timing Y' (L9) is time L12, the control terminal Q extends the network timing to time L13 by correction.

The control terminal Q performs backoff for issuance of a beacon frame using time L13 as a base point, to issue a beacon frame L15. Since the beacon frame L15 is issued during backoff carrier sense of a beacon frame by the terminal C of the logical network 1a using a network timing L14 as a base point, the beacon frame L15 causes the logical network 1a to know the presence of the logical network 1b for the first time. The subsequent operation of the control terminal C is similar to that of the control terminal Q.

As described above, by the operation of the control terminal, the network timings of the two networks are gradually synchronized. Since a beacon frame is issued after the backoff process, it can be guaranteed that beacon frame collision is certainly prevented. Therefore, the control terminal can detect a beacon frame from other logical network(s), thereby providing a mechanism of detecting interference from other logical network(s) as described in step S201 of FIG. 9.

Note that the corrected amount of network timing does not necessarily need to be ½. Alternatively, network timings may be synchronized by reducing network cycles.

Note that the frame structure of FIG. 7 is only for illustrative purposes and the present invention is not limited to this.

The case where there are two logical networks before unification has been described above. Even when there are three logical networks before unification, the logical networks can be similarly unified into one. Specifically, when a control terminal which has detected different network identifiers determines that there are two or more logical networks whose user identifiers correspond to each other in step S202 of FIG. 9, the control terminal goes to the operations of step S204 and thereafter, to determine whether or not to unify the logical networks. Thereafter, the control terminal selects a control terminal for a logical network after unification from the three or more logical networks before unification, and then unifies the logical networks.

In the above-described embodiment, it is determined whether or not a logical network to be controlled and other logical network(s) are under a control of the same user, based on whether or not the user identifiers correspond to each other (see step S202). The present invention is not limited to this.

In the above-described embodiment, it is determined whether or not network unification is permitted by a terminal apparatus of another logical network, using a unification request frame and its response. The present invention is not limited to this as long as it can be determined whether or not network unification is permitted by a terminal apparatus of another logical network.

In the above-described embodiment, it is determined whether or not logical networks are to be unified, by performing all of steps S202, S204 to S205, and S206 to S207. Alternatively, it is determined whether or not logical network unification is to be performed, by performing any one of the following processes of: determining whether or not logical networks are under a control of the same user; determining whether or not network unification is permitted by the user; or determining whether or not network unification is permitted by a terminal apparatus of another logical network.

Note that, when a failure (e.g., the failure 3a) occurs again due to a certain factor after the unification of FIG. 10, the following process may be performed.

The terminal apparatuses P to S which have belonging to the original logical network 1b are not inhibited from communicating with the control terminal Q, so that the failure 3a does not cause a problem in medium access.

On the other hand, a control terminal is absent for the terminal apparatuses A to D which have belonging to the original logical network 1a, due to the influence of the failure 3a. The terminal apparatus determines that a control terminal is absent, when a beacon frame has not been received for a period of time longer by some amount than a beacon frame issuance cycle which is expected to be issued periodically or within a certain time range. Thus, the terminal apparatus comprises a control terminal absence determining section for determining whether or not a control terminal is absent. When determining that a control terminal is absent, the terminal apparatus may perform the substantially the same process as the process flow of FIG. 3. Specifically, the terminal apparatus which has determined that a control terminal is absent becomes a control terminal if it is the first to issue a beacon frame after the process for being activated as a control terminal as illustrated in FIG. 3. A terminal apparatus which does not become a control terminal waits for an authentication request, is subjected to the authentication process, and operates as a controlled terminal as illustrated in FIG. 3.

Note that the terminal apparatus C which has been the original control terminal may operate as a control terminal with priority. This can be achieved by, for example, setting a short period of time for determining the absence of a control terminal in a terminal apparatus which has been originally a control terminal.

Although the case where a failure (e.g., the failure 3a) occurs again at the same location has been described, the occurrence of a failure after unification is not limited to this location.

As described above, according to the method of the present invention, logical unification and separation of networks can be repeatedly performed, depending on a communication state, and an optimum logical structure can be dynamically and automatically constructed, depending on the user's designation and a communication situation.

Second Embodiment

In the first embodiment, it is assumed that, after a failure is eliminated, a frame from each terminal apparatus reaches all terminal apparatuses. In the second embodiment, a method of unifying logical networks when a frame from each terminal apparatus does not reach all terminal apparatuses, will be described.

In the second embodiment, a structure of a whole system thereof is similar to that of the first embodiment, and will be described with reference to FIG. 1. Also in the second embodiment, a functional structure of each terminal apparatus is similar to that of the first embodiment, and will be described with reference to FIG. 2. In the second embodiment, each terminal apparatus can operate either in the control terminal mode or in the controlled terminal mode. Each terminal apparatus is assumed to have a function to, even if a control terminal has been once determined, change between a control terminal and a controlled terminal of a logical network, depending on the subsequent network form or transmission channel form, or the like. Each terminal apparatus transmits or receives a frame in the format of FIG. 7. A user identifier indicated in the user identification area D6 of the BSSID area D4 in a frame transmitted or received by each terminal apparatus is the same. In the user setting area D7, information that logical network unification is not forbidden is set.

Figure 16:
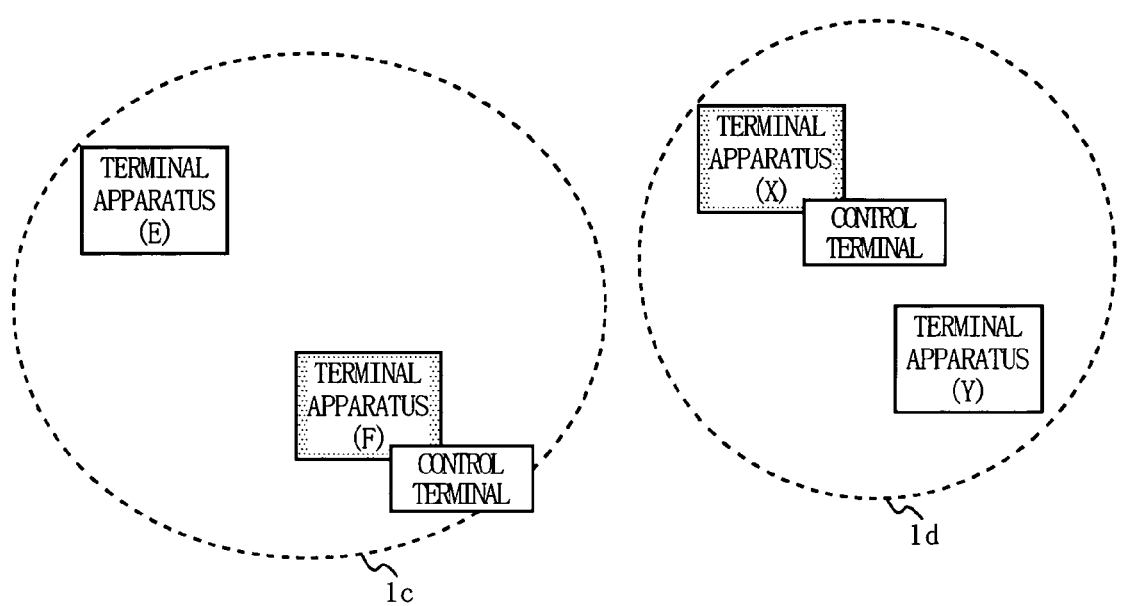
FIG. 16 is a schematic diagram illustrating logical networks $1c$ and $1d$ which are created for the first time.

FIG. 16 is a schematic diagram illustrating logical networks 1c and 1d which are created for the first time. Note that a communication medium is not illustrated in FIG. 16 (the same is true of the following figures). As illustrated in FIG. 16, it is assumed that the logical network 1c including terminal apparatuses E and F and the logical network 1d including terminal apparatuses X and Y originally exist. The terminal apparatus F is assumed to be a control terminal of the logical network 1c. The terminal apparatus X is assumed to be a control terminal of the logical network 1d.

FIG. 17 is a schematic diagram illustrating a structure of a whole system when a terminal apparatus G newly participates in the logical network 1c. The terminal apparatus G belongs to the logical network 1c and exists at a location at which the terminal apparatus G can receive a frame from the logical network 1d. Therefore, a frame transmitted by the terminal apparatus G is received by a terminal apparatus within the logical network 1d. In other words, interference occurs between the logical networks.

For example, when a power line is used as a communication medium, there is a possibility in the case of a relatively large house that some terminal apparatuses are provided at locations at which a communication signal does not reach from one to the other due to attenuation of the signal. In such a case, as illustrated in FIG. 16, there is a possibility that two logical networks are created. In such a situation, when a communication terminal is newly connected to a location at which the communication terminal can communicate with both the logical networks, a situation illustrated in FIG. 17 occurs.

FIG. 18 is a diagram illustrating a range J1 within which the terminal apparatus G can perform communication. In the situation of FIG. 18, the terminal apparatus X can receive a frame transmitted from the terminal apparatus G and detect the presence of the logical network 1*c*. However, the terminal apparatus Y (controlled apparatus) cannot receive a frame transmitted from the terminal apparatus G, E, or F, and cannot detect the presence of the logical network 1*c*. Therefore, if it is assumed that interference from adjacent logical network(s) is detected, and based on the result of the detection, a terminal apparatus capable of an efficient control is set to be a control apparatus, then the terminal apparatus X is an optimal control terminal of the logical network 1*d*. Therefore, a control terminal is not changed from the terminal apparatus X to another terminal apparatus.

An operation of the terminal apparatus X in such a situation will be described with reference to FIG. 9. The control processing section 101 of the terminal apparatus X (hereinafter simply referred to as the terminal apparatus X) receives a frame from the terminal apparatus G, thereby detecting a frame containing a network identifier which is different from that of the logical network id which is managed by the terminal apparatus X (step S201).

Next, the terminal apparatus X determines whether or not the user identifier of the received frame corresponds to a user identifier of the user management network 1 to which the logical network 1*d* of the terminal apparatus X belongs (step S202) Here, the user identifiers correspond to each other, and therefore, the terminal apparatus X goes to the operation of step S204.

In step S204, the terminal apparatus X references the user setting area D7 of the BSSID area D4 contained in an informed frame to confirm a setting concerning the logical network controlled by the terminal apparatus X (step S204).

The control terminal X determines whether or not logical network unification is permitted, based on the contents confirmed by step S204 (step S205). When logical network unification is not permitted, the control terminal X ends the process. On the other hand, when logical network unification is permitted, the control terminal X goes to the operation of step S206.

In step S206, the control terminal X generates a unification request frame with respect to a logical network to be unified, and causes the transmission/reception section 102 to transmit the frame. In this case, at the same time, the control terminal X activates the timer section 105, providing a certain expiration value, and waits for a response to the unification request frame.

Next, the control terminal X determines whether or not the response to the unification request frame is permission of logical network unification (step S207).

Here, in the logical network, only the terminal apparatus G can receive the unification request frame from the control terminal X. The terminal apparatus G does not currently operate as a control terminal, and therefore, transmits a frame indicating refusal of the unification request (hereinafter referred to as a refusal frame).

Therefore, based on the refusal frame, the terminal apparatus X determines that logical network unification is not permitted, and ends the process (step S207).

Next, an operation of the terminal apparatus G after transmission of the refusal frame will be described. The terminal apparatus G receives some frame (here, a unification request frame) from the adjacent logical network 1*d*, and informs the terminal apparatus F which is a control terminal of the logical network 1*c* to which the terminal apparatus G belongs, of the presence of external interference.

The second embodiment of the present invention has a mechanism that a terminal apparatus which detects interference from an adjacent logical network is set as a control terminal. Therefore, the terminal apparatus F starts to determine whether or not to change from a control terminal to a controlled terminal by detecting a fact that external interference occurs.

In order to determine whether or not to change from a control terminal to a controlled terminal, the terminal apparatus F (control terminal) may collect statistical information from terminal apparatus(es) belonging to the logical network 1*c* controlled by the terminal apparatus F, and based on the collected statistical information, may recognize a terminal apparatus suitable as a control terminal, and may give the status as a control terminal to the terminal apparatus.

As used herein, the statistical information refers to information from which a communication situation of a terminal apparatus of a logical network can be determined in predetermined intervals. Examples of the statistical information include an identifier of a terminal which can perform communication, the number of terminals which can perform communication, a network identifier, the number of issued frames, the number of received frames, the number of detected frames, the number of retransmitted frames, a level of a received frame signal, related information of these parameters, and the like.

An exemplary method of collecting the statistical information will be described below.

Figure 19:
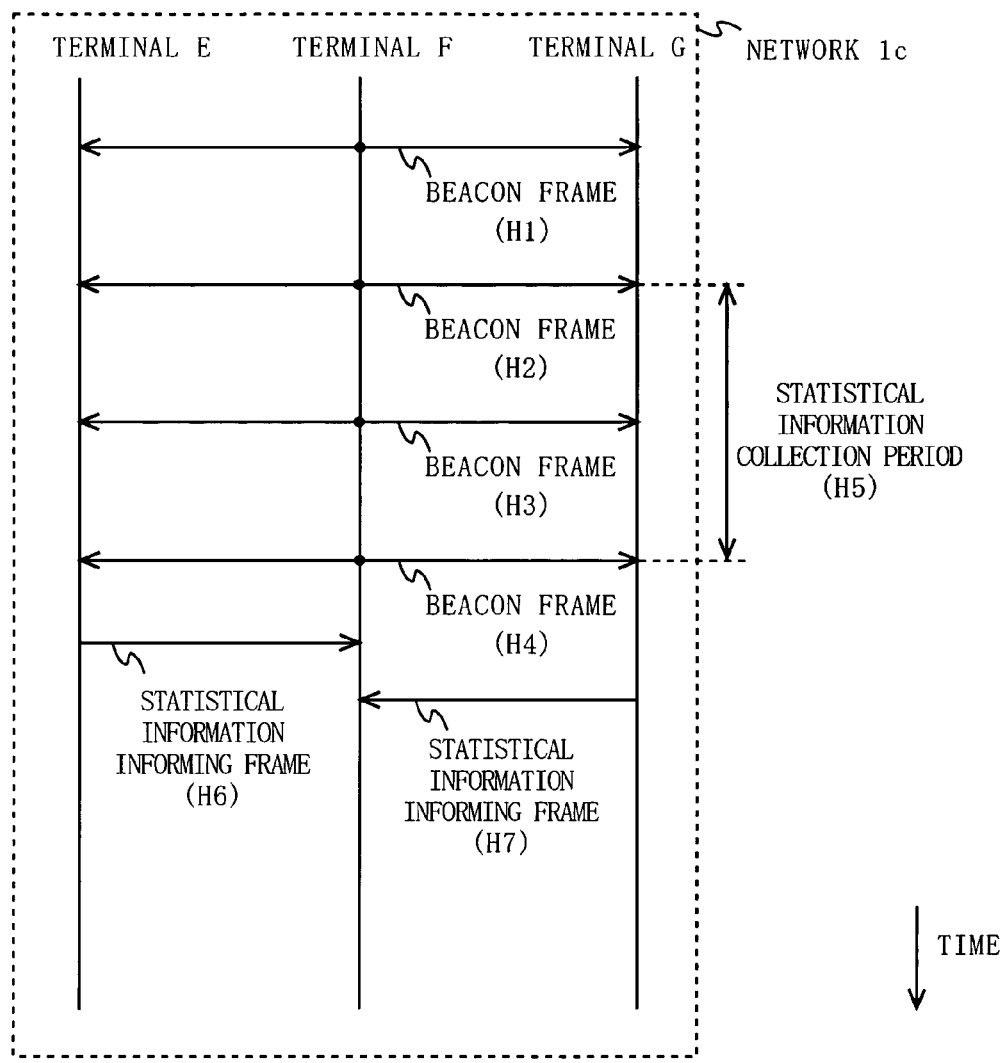
FIG. 19 is a sequence diagram illustrating an exemplary collection process of statistical information in the logical network $1c$.

FIG. 19 is a sequence diagram illustrating an exemplary collection process of statistical information in the logical network 1*c*. In FIG. 19, H1 to H4 indicate beacon frames (broadcast) which are periodically issued by the control terminal F. H6 and H7 are control frames (statistical information informing frames) which the terminal apparatus E and the terminal apparatus G respectively issue to the control terminal F, and which inform collected statistical information. Although only the beacon frames and the statistical information informing frames are illustrated in FIG. 19, other ordinary data communication frames are assumed to be within the logical network 1*c* as well as the adjacent logical network 1*d*. A statistical information collection period (H5) refers to a period of time during which statistical information is collected by detection of such data communication frames.

Figure 20:
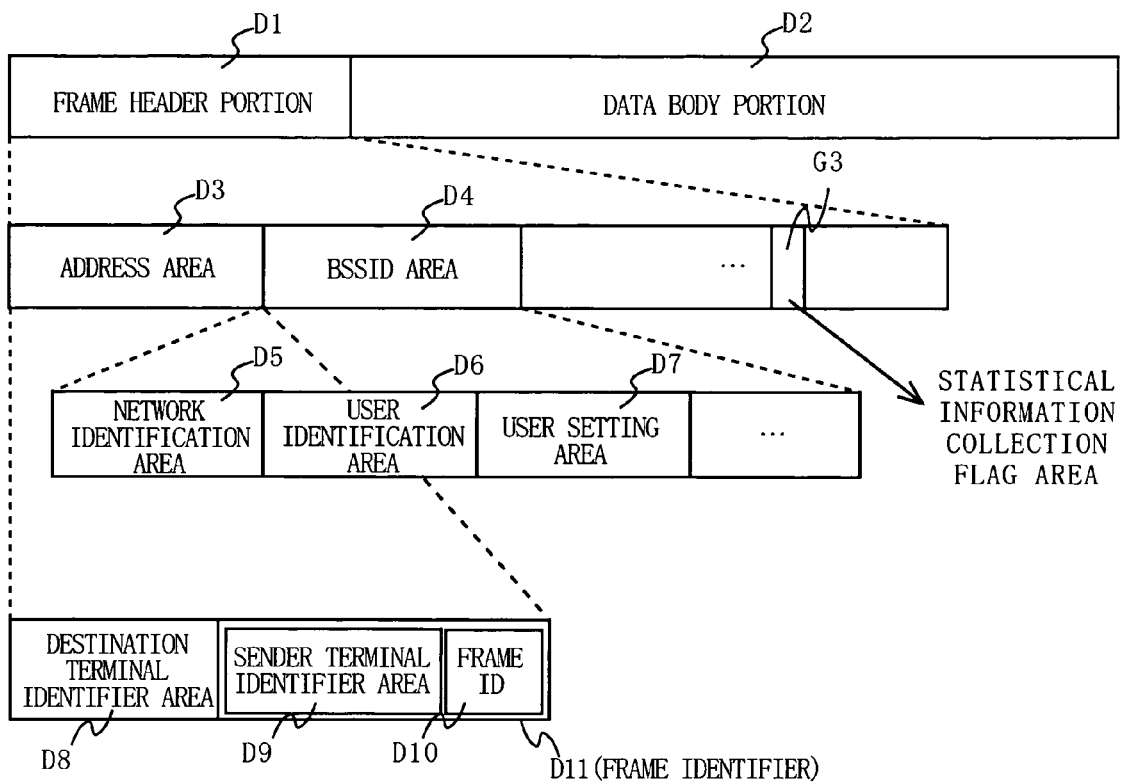
FIG. 20 is a diagram illustrating an exemplary format of a beacon frame used in a second embodiment of the present invention.

FIG. 20 is a diagram illustrating an exemplary format of a beacon frame used in the second embodiment. A beacon frame is composed of a frame header portion G1 and a data body portion G2, similar to an ordinary frame. The frame header portion G1 includes a statistical information collection field G3. In the statistical information collection field, a statistical information collection flag is described. When the flag is TRUE, statistical information is supposed to be collected. Specifically, a terminal apparatus which has received a beacon frame references the statistical information collection field G3 of the beacon frame. If the flag is TRUE, the terminal apparatus starts collection of statistical information (or continues to perform collection). If the flag is FALSE, the terminal apparatus stops collection of statistical information (or continues not to perform collection). Note that the setting of the statistical information collection flag is performed by a control terminal, and the control terminal also complies with the stipulation of statistical information collection flag, and performs collection of statistical information.

In FIG. 19, it is assumed that the beacon frames H1 and H4 have a statistical information collection flag of FALSE. It is also assumed that the beacon frames H2 and H3 have a statistical information collection flag of TRUE. Therefore, as illustrated in FIG. 19, a statistical information collection period is a period of time indicated by H5. Since the statistical information collection flag described in the statistical information collection field G3 of the beacon frame H1 is FALSE, the terminal apparatuses E and G do not collect statistical information. Since the terminal apparatuses E and G reference the statistical information collection field G3 of the beacon frame H2 to find that the statistical information collection flag is TRUE, the terminal apparatuses E and G starts collection of statistical information. When receiving the beacon frame H4, since the statistical information collection flag described in the statistical information collection field G3 is FALSE, the terminal apparatuses E and G stop collection of statistical information. Here, when collection of statistical information is stopped, a controlled terminal (the terminal apparatuses E and G) generates and issues a statistical information informing frame (H6 and H7) including the collected statistical information to a control terminal to inform the control terminal of the collected statistical information.

As described above, the statistical information of a terminal belonging to the logical network 1c is informed of and collected into a control terminal by a control of the control terminal F.

Here, in the logical network 1c, interference of the logical network 1d to which only the terminal apparatus G is adjacent is detected, so that statistical information informed from the terminal apparatus G indicates a highest level of external interference. Therefore, the terminal apparatus G becomes a control terminal in place of the terminal apparatus F which has been a control terminal.

However, the terminal apparatus G and the terminal apparatus E cannot perform direct communication with each other. Therefore, the terminal apparatus G requests the terminal apparatus F to relay a beacon frame issued by the terminal apparatus G, a frame to be transmitted to the terminal apparatus E, and a frame transmitted from the terminal apparatus E to the terminal apparatus G. In response to this, the terminal apparatus F operates as a relay terminal. The relay terminal is also a terminal whose opportunity of access to a communication medium is controlled by a control terminal, i.e., the relay terminal is a controlled terminal. The operation mode setting section 106 is assumed to be able to set whether or not a terminal apparatus operates as a relay terminal.

FIG. 21 is a schematic diagram illustrating a whole structure of a system when the terminal apparatus F operates as a relay terminal and the terminal apparatus G operates as a control terminal. Note that, in the state of FIG. 21, interference occurs between the logical network 1c and the logical network 1d, however, the changing of the control terminal no longer takes place in the logical network 1c.

When the system of FIG. 21 is constructed, the terminal apparatus X which is a control terminal of the logical network 1d or the terminal apparatus G which is a control terminal of the logical network 1c is supposed to detect external interference (see step S201 of FIG. 9). Therefore, the terminal apparatus X which is a control terminal of the logical network 1d or the terminal apparatus G which is a control terminal of the logical network 1c is supposed to operate the operation of FIG. 9. Here, it is assumed that the terminal apparatus X which is a control terminal of the logical network 1d first detects interference and performs the operation of FIG. 9.

In a manner similar to that described above, the terminal apparatus X goes to the operation of step S206 and issues a unification request frame. In this case, the terminal apparatus G is assumed to transmit a frame indicating permission of unification (hereinafter referred to as a permission frame). In response to this, the terminal apparatus X determines that logical network unification is permitted (YES of step S207), and exchanges network information with a control terminal (the terminal apparatus G) on the logical network (1c) to be unified, thereby determining a control terminal after unification, unification timing, and a network identifier after unification (steps S208 and S209). Note that, in the second embodiment, there is a relay terminal which relays frame(s) from other terminal apparatus(s), among controlled terminals, and therefore, the operation of step S208 is slightly different from that of the first embodiment.

Figure 22:
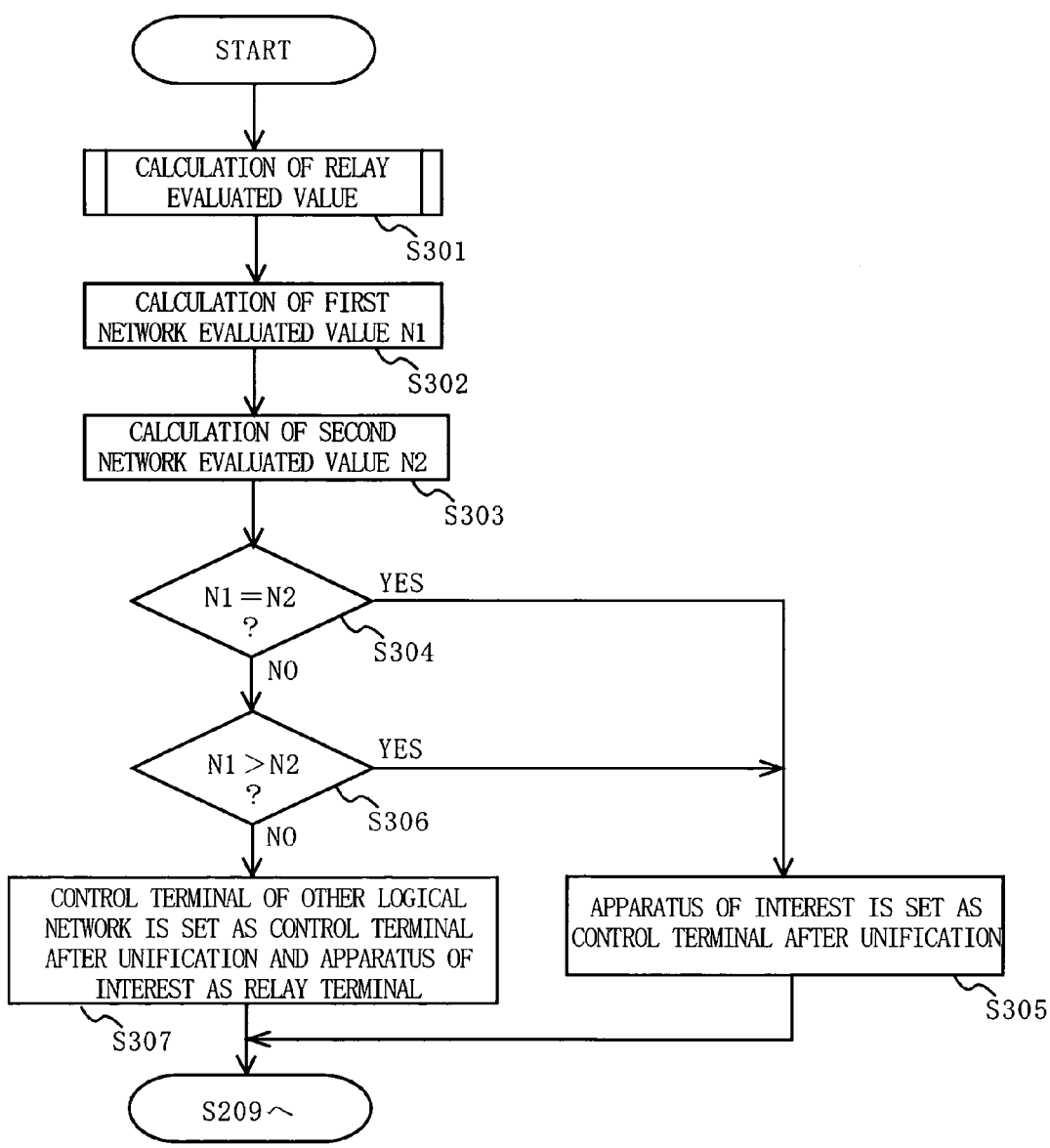
FIG. 22 is a flowchart illustrating an operation of step S208 in the second embodiment in detail.

FIG. 22 is a flowchart illustrating the operation of step S208 in the second embodiment in detail. Hereinafter, the operation of step S208 in the second embodiment will be described in detail with reference to FIG. 22.

The terminal apparatus X calculates a relay evaluated value for each terminal apparatus within the user management network 1 (step S301).

Here, the relay evaluated value will be described in detail. The terminal apparatus X which is a control terminal of the logical network 1d is assumed to steadily receive statistical information concerning communication state(s) from controlled terminal(s). Therefore, the terminal apparatus X knows a communication range of each controlled terminal of the logical network 1d. The terminal apparatus X which is a control terminal of the logical network 1c is assumed to steadily receive statistical information concerning communication state(s) from controlled terminal(s). Therefore, the terminal apparatus X knows a communication range of each controlled terminal of the logical network 1c. Therefore, the terminal apparatus X and the terminal apparatus G communicate with each other, thereby recognizing the communication range of each controlled terminal of the logical network 1d and the communication range of each controlled terminal of the logical network 1c, and therefore, can recognize a communication possible range of a controlled terminal belonging to the whole user management network 1. Note that, in this case, each controlled terminal is assumed to inform a control terminal of an identifier of a terminal apparatus which can perform communication as statistical information.

Figure 23:
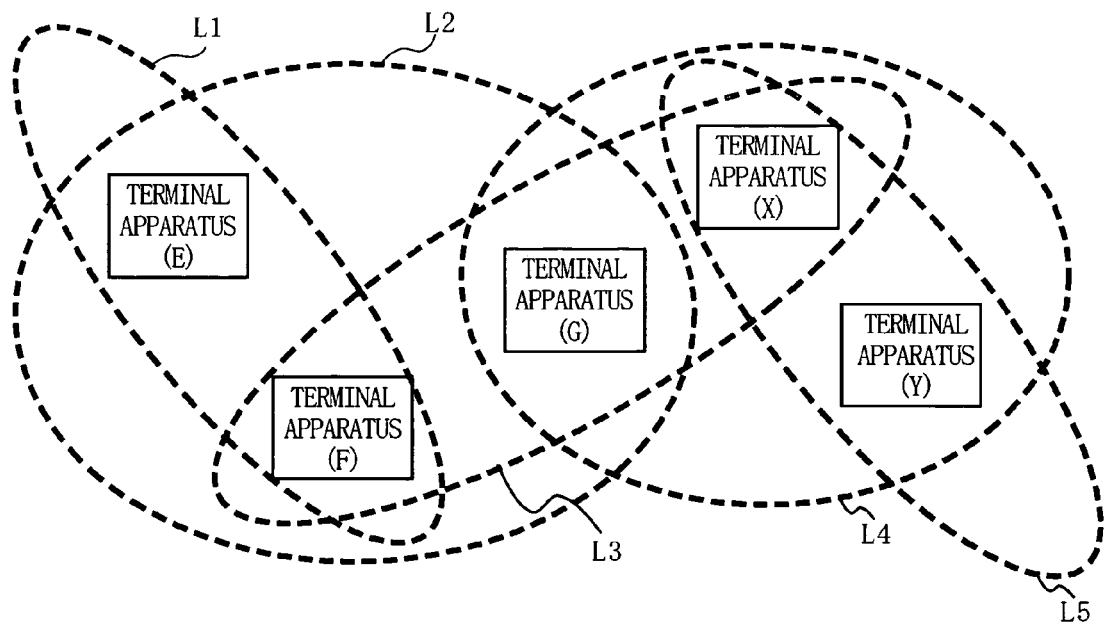
FIG. 23 is a diagram illustrating a communication possible range of a controlled terminal within a whole user management network 1.

FIG. 23 is a diagram illustrating the communication possible range of a controlled terminal within the whole user management network 1. In FIG. 23, a range L1 indicates the communication possible range of the terminal apparatus E. A range L2 indicates the communication possible range of the terminal apparatus F. A range L3 indicates the communication possible range of the terminal apparatus G. A range L4 indicates the communication possible range of the terminal apparatus X. A range L5 indicates the communication possible range of the terminal apparatus Y. As illustrated in FIG. 23, the terminal apparatuses X and G can recognize the communication possible range of a controlled terminal belonging to the whole user management network 1. Note that the communication possible range may be recognized by associating an identifier of the terminal apparatus therewith.

Figure 24:
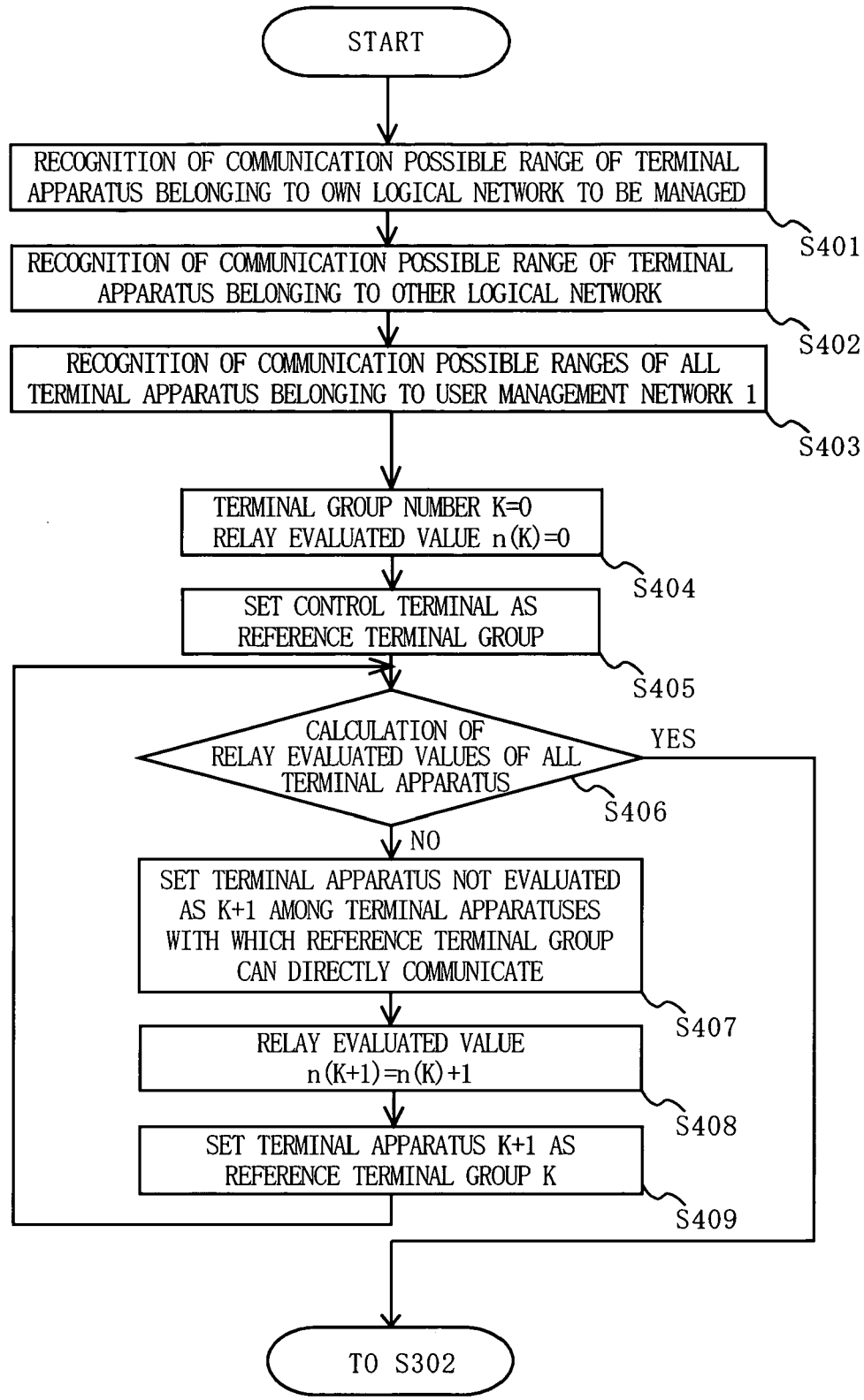
FIG. 24 is a flowchart illustrating a detailed operation for calculating a relay evaluated value in step S301 of FIG. 22.

FIG. 24 is a flowchart illustrating a detailed operation for calculating a relay evaluated value in step S301 of FIG. 22. Hereinafter, the detailed operation for calculating a relay evaluated value in step S301 of FIG. 22 will be described with reference to FIGS. 23 and 24.

The terminal apparatus X recognizes the communication range of each controlled terminal of the logical network 1*d* controlled by the terminal apparatus X, based on statistical information (step S401).

Next, the terminal apparatus X recognizes the communication range of each controlled terminal within the other logical network 1*c* by communicating with the terminal apparatus G (step S402).

Next, the terminal apparatus X recognizes the communication possible range of a controlled terminal belonging to the whole user management network 1 based on the communication range of each controlled terminal of the logical network 1*d* recognized in step S401 and the communication range of each controlled terminal of the logical network 1*c* recognized in step S402 (step S403).

Next, the terminal apparatus X sets the terminal group number k thereof to be 0 and a relay evaluated value n(k) to be 0 (step S404).

Next, the terminal apparatus X sets itself which is a control terminal to be a reference terminal group (step S405)

Next, the terminal apparatus X determines whether or not a relay evaluated value has been calculated for all terminal apparatuses within the user management network 1 (step S406). When the calculation has done for all the terminal apparatuses, the terminal apparatus X ends the process. On the other hand, when the calculation has not done for all the terminal apparatuses, the terminal apparatus X extracts a terminal apparatus whose relay evaluated value has not yet been calculated, among terminal apparatuses with which a terminal apparatus belonging to the reference terminal group can communicate, no matter whether the terminal apparatus belongs to the logical network 1*d* or the logical network 1*c*, and sets the terminal group number to be k+1 (step S407).

Next, the terminal apparatus X sets the relay evaluated value n(k+1) of a terminal apparatus whose terminal group number has been determined to be k+1 in step S404, to be n(k)+1 (step S408).

Next, the terminal apparatus X replaces k with k+1 where a terminal apparatus whose terminal group number is k+1 is regarded as a reference terminal group (step S409), and returns to the operation of step S406.

The relay evaluated values of all terminal apparatuses within the user management network 1 are calculated by the operation of FIG. 24.

Referring back to FIG. 22, after step S301, the terminal apparatus X calculates a first network evaluated value N1 indicating network efficiency when the terminal apparatus X becomes a control terminal for a logical network after unification of the logical network of the terminal apparatus X (step S302) For example, the network evaluated value is a total of relay evaluated values of the terminal apparatuses within the user management network 1, or the maximum relay evaluated value of the terminal apparatuses within the user management network 1.

Next, the terminal apparatus X communicates with a control terminal G of the logical network 1*c* to be unified, to obtain a second network evaluated value N2 indicating network efficiency when the control terminal G becomes a control terminal for a logical network after unification (step S303). When the operation of step S303 is performed, the terminal apparatus G which is a control terminal of the logical network 1*c* determines the communication range of each terminal apparatus (FIG. 23), calculates the relay evaluated value of each terminal apparatus in accordance with the flowchart of FIG. 24, and based on the relay evaluated value, calculates a network evaluated value. Thereafter, the terminal apparatus G transmits the calculated network evaluated value to the terminal apparatus X. Note that the terminal apparatus X recognizes the communication possible ranges of all the terminal apparatuses within the user management network 1, and therefore, can calculate the second network evaluated value N2.

Next, the terminal apparatus X determines whether or not the first network evaluated value N1 is equal to the second network evaluated value N2 (step S304). When they are equal to each other, the terminal apparatus X determines that the terminal apparatus X itself becomes a control terminal after unification, determines unification timing, and informs the terminal apparatus G (step S305), and goes to the operation of step S209. Thereafter, the terminal apparatus X operates as a control terminal for a new logical network (step S212).

In step S304, when the first network evaluated value N1 is not equal to the second network evaluated value N2, the terminal apparatus X determines whether or not the first network evaluated value N1 is greater than the second network evaluated value N2 (step S306) When the first network evaluated value N1 is greater than the second network evaluated value N2, the terminal apparatus X goes to the operation of step S305. On the other hand, when the first network evaluated value N1 is not greater than the second network evaluated value N2, the terminal apparatus X informs the terminal apparatus G that the terminal apparatus G is to be a control terminal for a logical network after unification, and instructs the operation mode setting section 106 that the terminal apparatus X is to operate as a relay terminal for the logical network for unification (step S307), and goes to the operation of step S209. In response to this, the operation mode setting section 106 sets that the terminal apparatus X is to operate as a relay terminal. Thereafter, the terminal apparatus X goes to the operations of step S209 and thereafter, and operates as a controlled terminal in accordance with unification timing determined by the terminal apparatus G (step S213).

Figure 25:
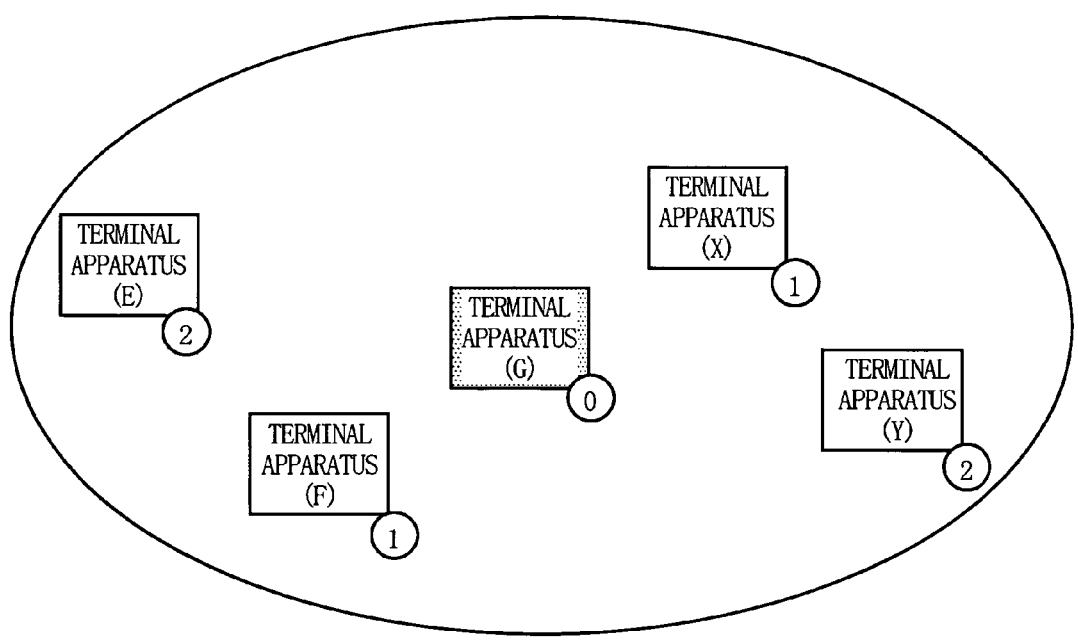
FIG. 25 is a diagram for specifically explaining a flow of a process of determining a control terminal after unification in the second embodiment.
Figure 26:
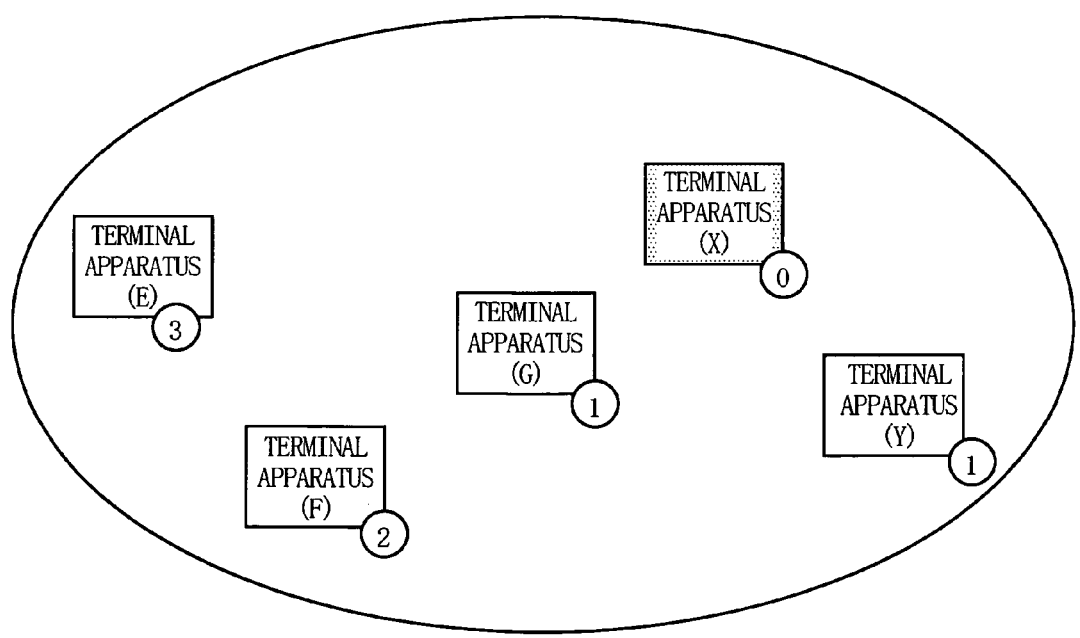
FIG. 26 is a diagram for specifically explaining a flow of a process of determining a control terminal after unification in the second embodiment.

FIGS. 25 and 26 are diagrams for specifically explaining a flow of a process of determining a control terminal after unification in the second embodiment of the present invention.

FIG. 25 illustrates a relay evaluated value calculated by the terminal apparatus G. As illustrated in FIG. 25, the relay evaluated value of a terminal apparatus (X and F in FIG. 25) which can perform direct communication with respect to the terminal apparatus G is 1. The relay evaluated value of a terminal apparatus (E and Y in FIG. 25) which can communicate with the terminal apparatus G via one terminal apparatus is 2. In this case, the terminal apparatus G sums the relay evaluated values to obtain the second network evaluated value N2, which is 6. Alternatively, the terminal apparatus G calculates the greatest relay evaluated value to obtain the second network evaluated value N2, which is 2. Thus, the network evaluated value indicates the efficiency of a logical network indicating how short time it takes for a frame to reach.

FIG. 26 illustrates a relay evaluated value calculated by the terminal apparatus X. As illustrated in FIG. 26, the relay evaluated value of a terminal apparatus (G and Y in FIG. 26) which can perform direct communication with respect to the terminal apparatus X is 1. The relay evaluated value of a terminal apparatus (F in FIG. 26) which can communicate with the terminal apparatus X via one terminal apparatus is 2. The relay evaluated value of a terminal apparatus (E in FIG. 26) which can communicate with the terminal apparatus X via two terminal apparatuses is 3. In this case, the terminal apparatus X sums the relay evaluated values to obtain the first network evaluated value N1, which is 7. Alternatively, the terminal apparatus X calculates the greatest relay evaluated value to obtain the first network evaluated value N1, which is 3.

In the examples of FIGS. 25 and 26, for the terminal apparatus X, the first network evaluated value N1 is 7, and the second network evaluated value N2 is 6. Thus, N1<N2. Therefore, the terminal apparatus X goes from step S306 along the flow of "NO". Therefore, the terminal apparatus X determines the terminal apparatus G as a control terminal after unification.

The terminal apparatus X hands over a right to control the logical network 1d to the terminal apparatus G. In this case, the terminal X may transfer network information concerning the logical network 1d to the control terminal G. As used herein, the network information may refer to an identifier of a terminal apparatus belonging to the network, information concerning reservation of a band which is used in the logical network 1d, and the like. Thereafter, the terminal apparatus X functions as a relay terminal which relays a beacon frame issued by the terminal apparatus G or a frame from a terminal apparatus belonging to the original logical network 1c, to a terminal apparatus belonging to the original logical network 1d, or a relay terminal which relays a frame from a terminal apparatus belonging to the logical network 1d to a terminal apparatus belonging to the original logical network 1c. In order to achieve such a relay function, the terminal apparatus X as a relay terminal has information concerning such a network logical structure or information concerning a relay request (these are referred to as relay information) in addition to information which is possessed by an ordinary controlled terminal. The terminal apparatus X has a function to reference relay information from a received frame and select a frame to be repeatedly issued, and a function to repeatedly issue the received frame. The same is true of the terminal apparatus F.

FIG. 27 is a schematic diagram illustrating a structure of a logical network 1e after unification. As illustrated in FIG. 27, the terminal apparatus G is a control terminal and the terminal apparatuses F and X are relay terminals, so that the single logical network 1e is operated. The network identifier of the logical network 1e may be the same as the network identifier of the original logical network 1c.

Hereinafter, an exemplary relay system in which a relay apparatus is provided will be described.

The format of FIG. 20 is used as the format of a frame issued in a network of this example. Specifically, as illustrated in FIG. 20, a frame includes the statistical information collection field G3. The address area D3 includes the destination terminal identifier area D8, the sender terminal identifier area D9, and a frame ID area D10. In the frame ID area D10, a frame ID which uniquely identifies an issued frame specific to each terminal is described. A combination of the sender terminal identifier area D9 and the frame ID area D10 is referred to as a frame identifier area D11. A sender terminal identifier is an identifier which uniquely identifies a terminal apparatus of a network. Therefore, an identifier (frame identifier) described in an area which is a combination of the sender terminal identifier area D9 and the frame ID area D10, determines a frame on a network. Note that the frame ID can have a large size such that it takes a sufficient long time to assign the same ID, and the frame ID area D10 has a size which satisfies such a request.

Terminal apparatuses which are set as a control terminal and a relay terminal know terminal apparatus(es) within a range in which a frame issued by those terminal apparatuses can reach. In this example, as described above, since a terminal apparatus which is originally a control terminal is set as a relay terminal, the terminal apparatus which is to be a relay terminal stores an identifier of a controlled terminal belonging to the original network, and additionally stores an identifier of a terminal apparatus which subsequently participates in a network. Thereby, the terminal apparatus which is to be a relay terminal can easily prepare information (relay information) requiring relay.

When detecting a frame, the control terminal and the relay terminal do not perform a relay process if the detected frame is unicast or multicast, and both the terminal identifiers described in the destination terminal identifier area D8 and the sender terminal identifier D9 indicate a terminal apparatus or a terminal apparatus group within a range which a frame issued by the control terminal or the relay terminal can reach.

When detecting a frame, the control terminal and the relay terminal performs a relay process if the detected frame is unicast or multicast, and at least one of the terminal identifiers described in the destination terminal identifier area D8 and the sender terminal identifier D9 indicates the terminal identifier of a terminal apparatus or the identifier of a terminal apparatus group beyond a range which a frame issued by the control terminal or the relay terminal can reach, or if the detected frame is broadcast.

The relay process refers to a process of reissuing a frame as it is, only once, with respect to a frame identifier. It can be determined whether or not a frame is a reissued frame, by referencing the frame identifier area D11. Therefore, the control terminal and the relay terminal can achieve the process of reissuing a received frame only once. Note that the control terminal and the relay terminal store a frame identifier which has been reissued once, in order to determine whether or not a frame is a frame which has already been reissued. Note that the control terminal and the relay terminal may release the memory storing the once-reissued frame identifier, depending on some time, the number of times of frame reissuance by the relay process, or the like.

A terminal apparatus constructing the relay system described above can relatively easily construct a relay system without issuing a waste frame so frequently on a relatively small-size network (a small number of relay stages).

As described above, according to the second embodiment, even when a frame needs to be relayed, an optimal terminal apparatus is selected as a control terminal after unification before unification of logical networks. Therefore, unification is performed in order to improve the efficiency of a whole network.

Note that, in the second embodiment, the terminal apparatus X determines whether a terminal apparatus after unification is X or G. Alternatively, the determination may be performed by the terminal apparatus G. In this case, the terminal apparatus G may obtain two network evaluated values and determine a control terminal after unification in a manner similar to that described above.

Third Embodiment

In the first and second embodiments, exemplary unification and interference of networks in which communication is performed with the same channel have been described. In a third embodiment, as an example, a network form which is used for wireless LAN or the like, and in which a transmission band is divided into a plurality of channels, will be described. The functional structure of each terminal is similar to that of the first embodiment and will be described with reference to FIG. 2. Note that the transmission/reception section 102 defines and manages channels divided in terms of frequency, and has a function to perform transmission/reception appropriate for a channel used in communication. In the third embodiment, each terminal apparatus can operate in a control terminal mode (hereinafter referred to as an access point mode in the third embodiment) or a controlled terminal mode (hereinafter referred to as a station mode in the third embodiment). Each terminal apparatus also has a function to change between the access point mode and the station mode during an operation of the terminal. An access point can change channels used in a network, and has a function to inform of a station(s) belonging to the access point of the channel change. Each terminal apparatus can also change channels used for communication during operation.

Figure 28:
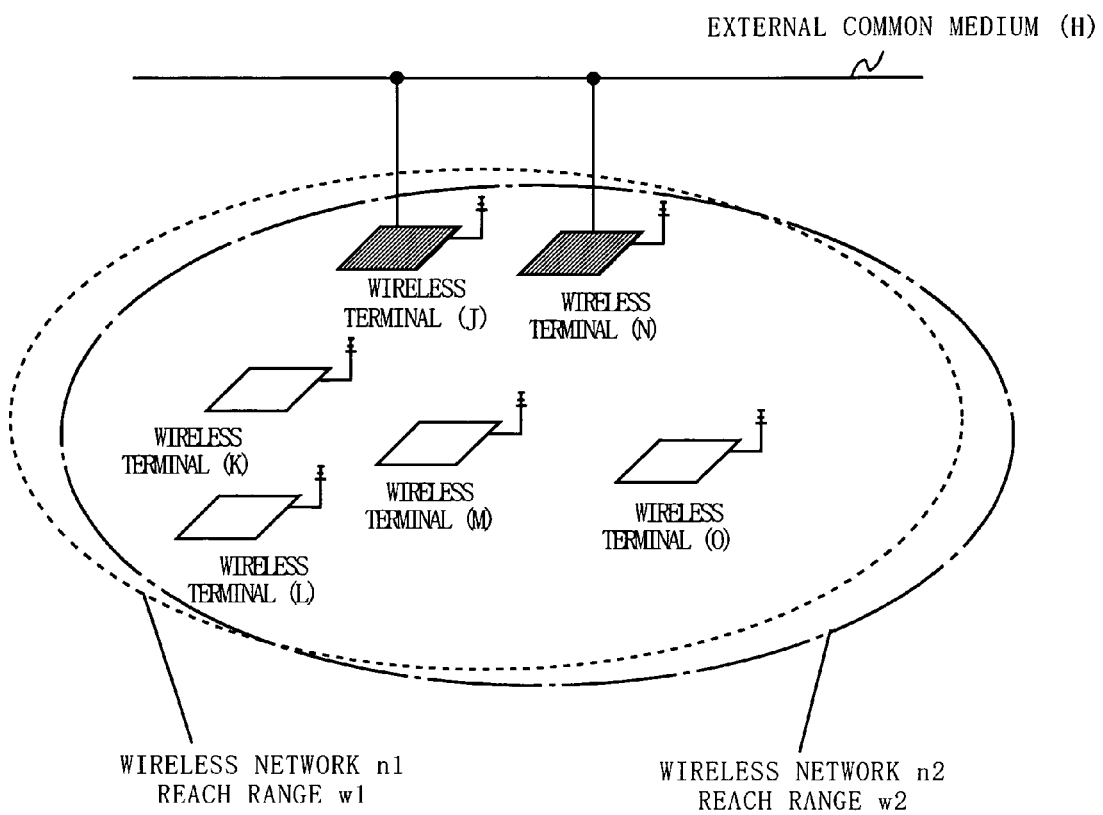
FIG. 28 is a diagram illustrating an exemplary structure of a wireless network according to a third embodiment of the present invention.

FIG. 28 is a diagram illustrating an exemplary structure of a wireless network according to the third embodiment of the present invention. In FIG. 28, a wireless network n1 is composed of wireless terminals J, K, and L. It is assumed that an access point of the wireless network n1 is the wireless terminal J. A reach range of the wireless network n1 is indicated with w1. A wireless network n2 is composed of wireless terminals M, N, and O. An access point of the wireless network n2 is assumed to be the wireless terminal N. A reach range of the wireless network n2 is indicated with w2. The wireless terminals J and N, which are access points, are connected to each other via an external communication medium H. The external communication medium H may be either a wireless medium or a wired medium.

In FIG. 28, the wireless networks n1 and n2 covers radio wave reach ranges w1 and w2, respectively. In ordinary wireless networks, a transmission channel is divided in terms of frequency. Such a mechanism can avoid the adjacent network interference problem. Specifically, in the wireless networks n1 and n2, their reach ranges of wireless radio wave seem to interfere with each other, as illustrated with w1 and w2. However, the wireless terminals J and N, which are access points, use channels which are defined in frequency bands different from each other. Therefore, interference does not occur.

In ordinary wireless protocols, communication extending over two networks is achieved by each access point performing relay via the external communication medium H. However, if relay cannot be performed unless the wireless terminal J, the wireless terminal N, and the external communication medium H are used, although the wireless network n1 and the wireless network n2 do not need to be separated as different networks, communication between the networks is inefficient. For example, when communication is performed from the wireless terminal K to the wireless terminal O, wireless radio waves transmitted from the two wireless terminals sufficiently reach the other end of the communication, so that the two wireless terminals can perform direct communication. However, in ordinary wireless protocols, a frame issued by the wireless terminal K is transferred to the wireless terminal J, and via the external communication medium H to the wireless terminal N, and by the wireless terminal N to the wireless terminal O. This causes each access point to perform an unnecessary operation, and in addition, wastefully increases traffic of the external communication medium H and the wireless networks n1 and n2.

Figure 29:
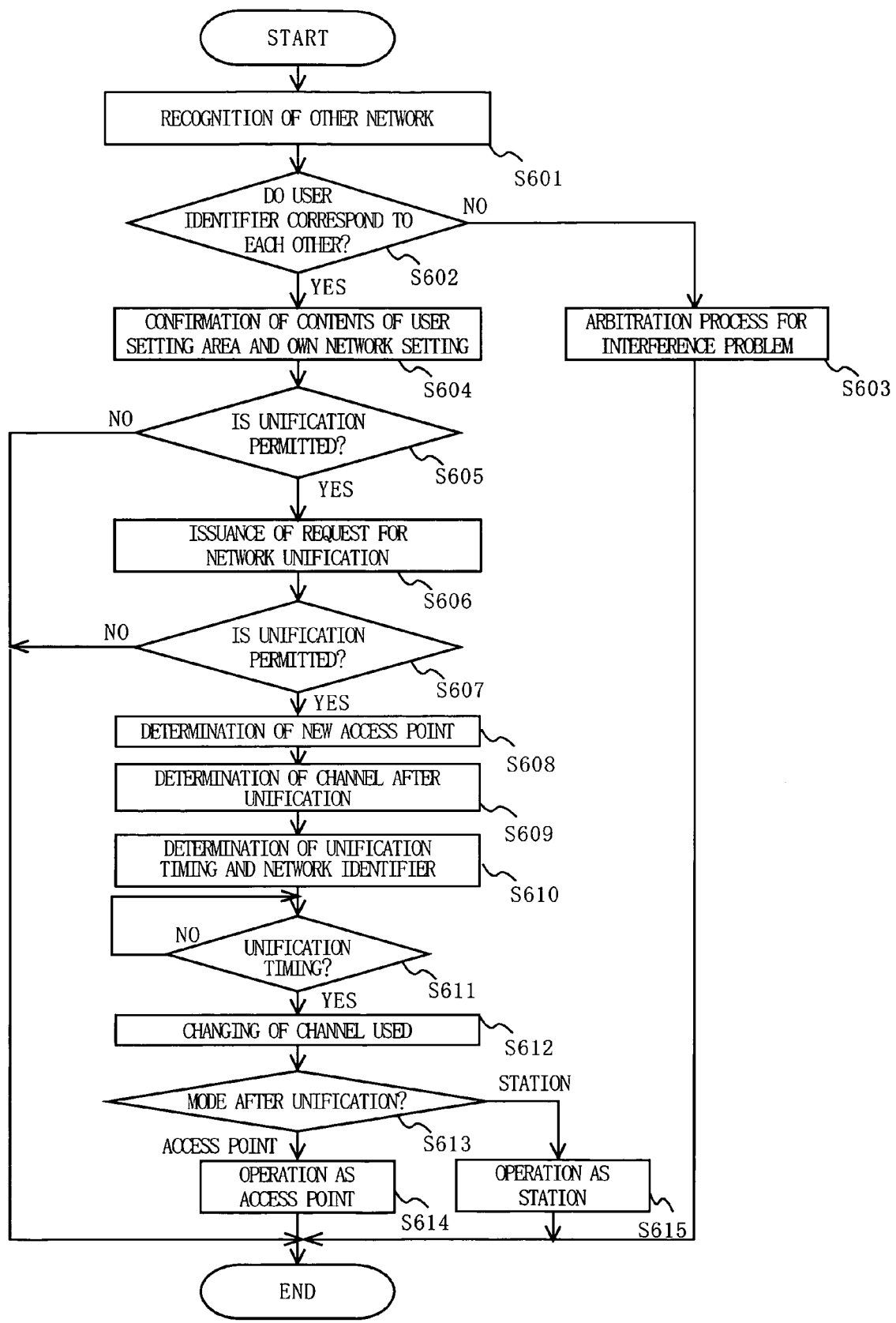
FIG. 29 is a flowchart illustrating an operation of an access point which detects the presence of another wireless network adjacent thereto.

Also in such a situation, the present invention can be effectively applied. FIG. 29 is a flowchart illustrating an operation of an access point which detects the presence of other wireless network(s) adjacent thereto. Hereinafter, the operation of an access point which detects the presence of other wireless network(s) adjacent thereto will be described with reference to FIG. 29. Note that the flowchart of FIG. 29 is substantially the same as that of FIG. 9 and the description thereof will be omitted as appropriate.

When an access point of the wireless network n1 or n2 recognizes the presence of other wireless network(s) with a certain method (step S601), the flow of FIG. 29 starts. Here, the access point may detect the presence of other wireless network(s) by detecting radio wave accompanying data transfer directly issued by other wireless network(s), or by a station which belongs to the access point, detecting radio wave accompanying data transfer directly issued by other wireless network(s) and informing such information of the access point. The access point may has a function to regularly perform carrier sense with respect to a channel other than that used in a network to determine the presence or absence of communication on other wireless network(s), and a function to detect data transfer on other wireless network(s) by interpretation of the BSSID area, thereby detecting the presence or absence of other wireless network(s).

Next, an access point which has detected the presence of other wireless network(s) determines whether or not the user identifiers correspond to each other (step S602). When the user identifiers do not correspond to each other, the access point regards this situation as a network interference problem, and performs arbitration between the detected wireless network to be subjected to network interference and a wireless network to which the access point belongs (step S603). On the other hand, when the user identifiers correspond to each other, the access point goes to an operation of step S604.

In step S604, the access point confirms contents of a user setting area and setting contents of the wireless network to which the access point belongs, and based on the setting contents thus confirmed, determines whether or not to permit network unification (step S605). When network unification is permitted, the access point issues a network unification request to a wireless network to be unified (step S606). Next, the access point determines whether or not the network unification request is permitted by an access point of another wireless network. If the request is permitted, the access point determines a new access point after unification (step S608), and goes to an operation of step S609.

In step S609, a channel after unification is determined by negotiation between access points. After unification, in order that a wireless terminal which has belonged to the wireless network n1 and a wireless terminal which has belonged to the wireless network n2 perform communication using the same channel, a channel after unification is determined between access points. For example, a channel of a wireless network determined as a new access point in determined in step S608 may be determined as the channel after unification, or a channel which has not been used in each wireless network before unification may be determined as the channel after unification. Note that, for example, it is assumed that there is a wireless network n3 which is not unified but is close with respect to the wireless network n1, in addition to the wireless network n2. In such a case, the channel determined in step S609 needs to be a channel which is not used in the wireless network n3. In the negotiation in step S609, the access point of the wireless network n1 determines the channel after unification by informing the access point of the wireless network n2 of the presence of the wireless network n3.

After step S609, the access point determines unification timing and a network identifier after unification (step S610), and determines whether or not unification timing has arrived (step S611). When the unification timing has arrived, the access point goes to an operation of step S612.

In step S612, the access point changes a communication channel to the channel determined in step S609. When such a change is required, the access point issues a channel change statement to station(s) belonging to the access point. A station which has received the channel change statement changes a communication channel to a designated channel. Note that, when the same channel as that which has been used before unification is used, the access point performs no process in step S612.

Thereafter, the access point determines whether a mode after unification is the access point mode or the station mode (step S613). When the mode is the access point mode, the access point starts an operation as an access point (step S614). When the mode is the station mode, the access point starts an operation as a station (step S615).

As illustrated in the third embodiment, the present invention can be applied to a network protocol which uses a plurality of channels in terms of frequency, such as wireless LAN. Note that the present invention can be applied to any network protocol which uses a plurality of channels in terms of frequency, and is not limited to wireless LAN.

Although it is assumed that there are two logical networks before unification in the foregoing description, there may be three or more logical network before unification, and in this case, the logical networks can be similarly unified. Specifically, a control terminal which has detected network identifiers different from each other, recognize the communication possible ranges of terminal apparatuses belonging to all other logical network(s) to be unified in step S402, and recognizes the communication possible ranges of all terminal apparatuses in a user management network in step S403. Thereafter, the control terminal obtains a network evaluated value when the control terminal itself becomes a control terminal for a logical network after unification, and a network evaluated value when a control terminal of another logical network becomes a control terminal for a logical network after unification, based on the recognized communication possible range, and determines a control terminal having a highest network evaluated value as a control terminal for a logical network after unification.

Figure 30:
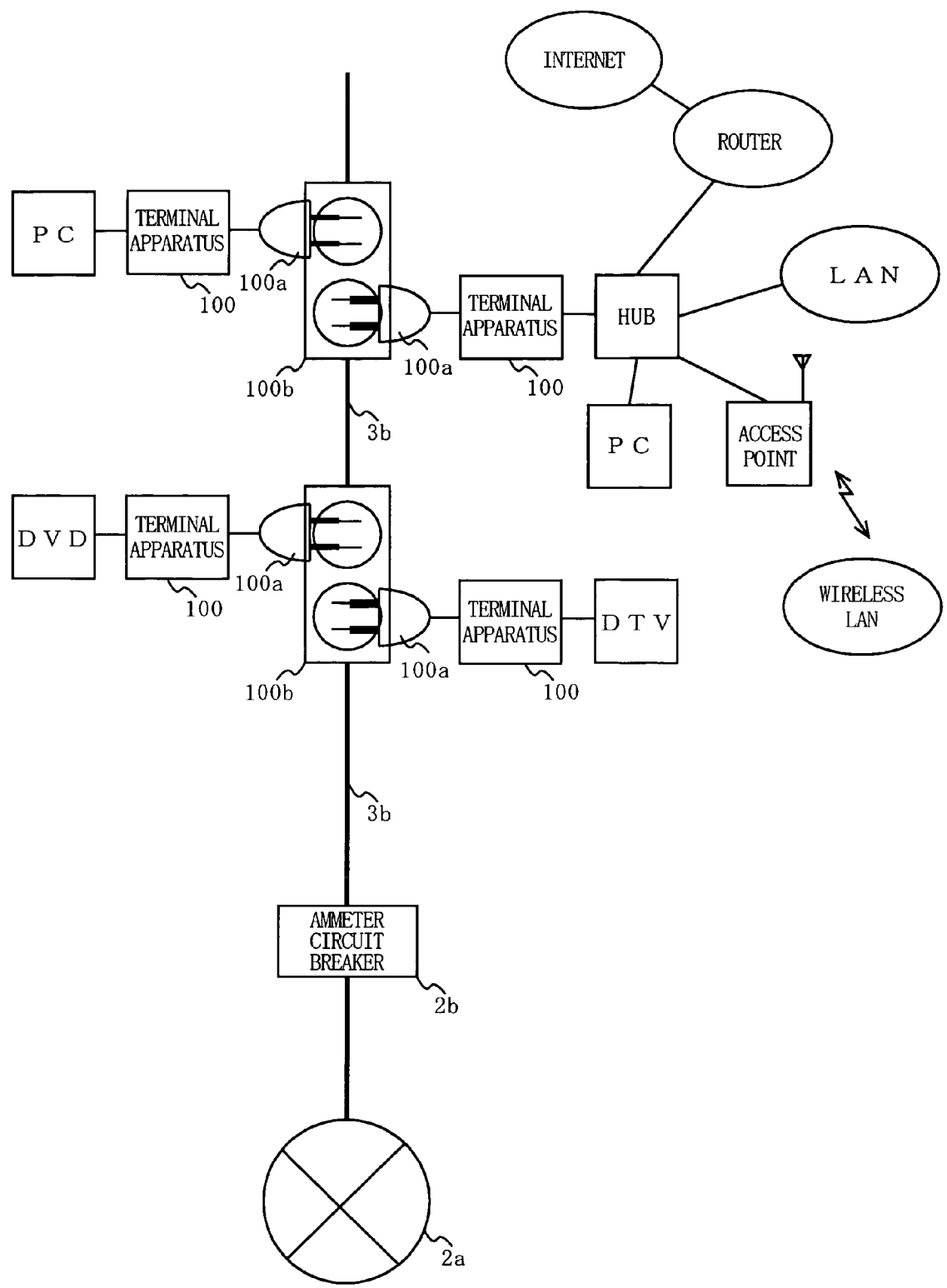
FIG. 30 is a schematic diagram illustrating a structure of a whole system when the present invention is applied to power line communication.

FIG. 30 is a schematic diagram illustrating a structure of a whole system when the present invention is applied to power line communication. In the system of FIG. 30, a power line 3b is used as a communication medium. Each terminal apparatus 100 has a plug 100a. The plug 100a is connected to a power source supply section and the transmission/reception section 102 of the terminal apparatus 100. The plug 100a is connected to a receptacle 100b. Thereby, power source is supplied to the terminal apparatus 100, and in addition, data is transmitted to or received from the terminal apparatus 100. The power line 3b, which is a communication medium, is connected to a utility power source line 2a outside a house via an ammeter circuit breaker 2b. A PC, a DVD, a digital television (DTV), a hub, or the like is connected to the terminal apparatus 100. An access point, a PC, an LAN, a router, and the like are connected to the hub. The access point constitutes a wireless LAN. The Internet is connected to the router. Thus, when the present invention is applied to power line communication so that a plurality of logical networks are created in home or office, the logical networks can be automatically unified as required, thereby making it possible to efficiently use networks. Note that the terminal apparatus 100 may be incorporated in appliances.

Note that the present invention is not limited to power line communication and wireless communication. The present invention can be applied to various digital communication media, such as a telephone line, a television antenna line, a dedicated line, an outdoor power transmission line, an outdoor telephone line, an optical fiber, a cable television line, a dedicated audio line, a dedicated voice line, and the like, in addition to a power line and a wireless medium.

Note that the above-described embodiments can be each implemented by causing a CPU to execute a program capable of causing a CPU to execute the above-described procedure, the program being stored in a storage device (a ROM, a RAM, a hard disk, etc.). In this case, the program may be stored into the storage device via a recording medium before execution, or may be executed directly from the recording medium. The recording medium refers to a semiconductor memory, such as a ROM, a RAM, a flash memory or the like, a magnetic disk memory, such as a flexible disk, a hard disk or the like, an optical disc, such as a CD-ROM, a DVD, a BD or the like, a recording medium, such as a memory card or the like. The recording medium is a concept including a communication medium, such as a telephone line, a transfer line or the like.

Note that the control processing section 101 may be implemented as an integrated circuit (LSI). The functional blocks may be mounted on one chip, or a part or the whole of the functional blocks may be mounted on one chip. As used herein, LSI maybe called IC, system LSI, super LSI or ultra LSI, depending on the packaging density. The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used. Furthermore, if an integrated circuit technology which replaces LSI is developed by an advance in the semiconductor technology or other technologies derived therefrom, the functional blocks may be packaged using such a technology. A biotechnology may be applicable.

Note that the present invention may be applied to networks which are constructed in, for example, spaces, such as general houses, apartment houses including adjacent rooms, offices, factories, market buildings, and the like, and transport systems, such as automobiles, trains, airplanes, ships, and the like. In addition, even when a logical network is composed of an ad hoc network, the network structure can be optimized by the present invention.

When a plurality of logical networks are created physically adjacent to each other in a single communication medium, the terminal apparatus of the present invention can operate to construct a network which can prevent a reduction in efficiency of use of the communication medium, and therefore, is useful in the field of communication and the like.

While the invention has been described in detail, the foregoing description is in all aspects illustrative and not restrictive. It is understood that numerous other modifications and variations can be devised without departing from the scope of the invention.

What is claimed is:

1. A terminal apparatus of communicating with at least one other terminal apparatus via a communication medium, comprising:

an operation mode setting section operable to set the terminal apparatus to operate as a control terminal controlling an opportunity of access of the other terminal apparatus to the communication medium or as a controlled terminal whose opportunity of access to the communication medium is controlled by another terminal apparatus operating as a control terminal;

an interference recognizing section operable to recognize interference from at least one logical network other than a logical network to be controlled, when the operation mode setting section sets the terminal apparatus to operate as the control terminal;

a unification determining section operable to determine whether or not the logical network to be controlled is unified with the other logical network, when the interference recognizing section recognizes the interference from the other logical network; and a new control terminal determining section operable to determine whether a control terminal of a logical network newly created by unification is the terminal apparatus or a control terminal of the other logical network, when the unification determining section determines that the logical network to be controlled is unified with the other logical network, wherein the operation mode setting section sets the terminal apparatus to operate as the control terminal of the newly created logical network, when the new control terminal determining section determines that the control terminal of the newly created logical network is the terminal apparatus, and the operation mode setting section sets the terminal apparatus to operate as a controlled terminal of the newly created logical network, when the new control terminal determining section determines that the control terminal of the newly created logical network is the control terminal of the other logical network.

2. The terminal apparatus according to claim 1, wherein the operation mode setting section sets the terminal apparatus to operate as a relay terminal of the newly created logical network, when the new control terminal determining section determines that the control terminal of the newly created logical network is the control terminal of the other logical network.

3. The terminal apparatus according to claim 1, wherein the unification determining section determines that the local network to be controlled is unified with the other logical network, when the logical network to be controlled and the other logical network are under a control of the same user.

4. The terminal apparatus according to claim 1, wherein the unification determining section determines that the local network to be controlled is unified with the other logical network, when unification of the logical network to be controlled and the other logical network is permitted by a user.

5. The terminal apparatus according to claim 1, wherein the unification determining section determines that the local network to be controlled is unified with the other logical network, when unification of the logical network to be controlled and the other logical network is permitted by another terminal apparatus within the other logical network.

6. The terminal apparatus according to claim 1, wherein, when the terminal apparatus operates as the control terminal, the interference recognizing section performs carrier sense before issuing a frame, to recognize the interference from the other logical network.

7. The terminal apparatus according to claim 1, wherein, when the terminal apparatus operates as the control terminal and recognizes a signal from another logical network, the terminal apparatus operates so that network cycle start timing of a logical network to which the terminal apparatus belongs is synchronized with network cycle start timing of the other logical network, and transmits a beacon by random backoff.

8. The terminal apparatus according to claim 1, wherein, when the terminal apparatus operates as the controlled terminal, and the interference is detected from the other logical network, the controlled terminal may inform the control terminal that the interference from the other logical network has been detected.

9. The terminal apparatus according to claim 1, further comprising:

a control terminal absence determining section operable to determine whether or not the control terminal is absent, wherein, when the control terminal absence determining section determines that the control terminal is absent, the terminal apparatus starts an operation for determining a new control terminal.

10. The terminal apparatus according to claim 1, wherein the communication medium is divided into a plurality of channels, the interference recognizing section recognizes the interference from the other logical network by detecting another logical network which uses a channel different from a channel used by a logical network to which the terminal apparatus belongs, the unification determining section determines a channel used after unification, and after logical network unification, the channel after unification determined by the unification determining section is used to perform communication.

11. A processing method of a communication terminal communicating with at least one other terminal apparatus via a communication medium, comprising the steps of:

setting the communication terminal to operate as a control terminal controlling an opportunity of access of the other terminal apparatus to the communication medium or as a controlled terminal whose opportunity of access to the communication medium is controlled by another terminal apparatus operating as a control terminal;

recognizing interference from at least one logical network other than a logical network to be controlled, when the communication terminal is set to operate as the control terminal;

determining whether or not the logical network to be controlled is unified with the other logical network, when the interference from the other logical network is recognized;

determining whether a control terminal of a logical network newly created by unification is the communication terminal or a control terminal of the other logical network, when it is determined that the logical network to be controlled is unified with the other logical network;

setting the communication terminal to operate as the control terminal of the newly created logical network, when it is determined that the control terminal of the newly created logical network is the communication terminal; and setting the communication terminal to operate as a controlled terminal of the newly created logical network, when it is determined that the control terminal of the newly created logical network is the control terminal of the other logical network.

12. A computer program stored on a computer readable medium for use in a computer apparatus communicating with at least one other terminal apparatus via a communication medium, the computer program causing the computer apparatus to perform the steps of: setting a communication terminal to operate as a control terminal controlling an opportunity of access of the other terminal apparatus to the communication medium or as a controlled terminal whose opportunity of access to the communication medium is controlled by another terminal apparatus operating as a control terminal; recognizing interference from at least one logical network other than a logical network to be controlled, when the communication terminal is set to operate as the control terminal; determining whether or not the logical network to be controlled is unified with the other logical network, when the interference from the other logical network is recognized; determining whether a control terminal of a logical network newly created by unification is the communication terminal or a control terminal of the other logical network, when it is determined that the logical network to be controlled is unified with the other logical network; setting the communication terminal to operate as the control terminal of the newly created logical network, when it is determined that the control terminal of the newly created logical network is the communication terminal; and setting the communication terminal to operate as a controlled terminal of the newly created logical network, when it is determined that the control terminal of the newly created logical network is the control terminal of the other logical network.

13. An integrated circuit provided in a terminal apparatus communicating with at least one other terminal apparatus via a communication medium, comprising:

an operation mode setting section operable to set the terminal apparatus to operate as a control terminal controlling an opportunity of access of the other terminal apparatus to the communication medium or as a controlled terminal whose opportunity of access to the communication medium is controlled by another terminal apparatus operating as a control terminal;

an interference recognizing section operable to recognize interference from at least one logical network other than a logical network to be controlled, when the operation mode setting section sets the terminal apparatus to operate as the control terminal;

a unification determining section operable to determine whether or not the logical network to be controlled is unified with the other logical network, when the interference recognizing section recognizes the interference from the other logical network; and a new control terminal determining section operable to determine whether a control terminal of a logical network newly created by unification is the terminal apparatus or a control terminal of the other logical network, when the unification determining section determines that the logical network to be controlled is unified with the other logical network, wherein the operation mode setting section sets the terminal apparatus to operate as the control terminal of the newly created logical network, when the new control terminal determining section determines that the control terminal of the newly created logical network is the terminal apparatus, and the operation mode setting section sets the terminal apparatus to operate as a controlled terminal of the newly created logical network, when the new control terminal determining section determines that the control terminal of the newly created logical network is the control terminal of the other logical network.

* * * * *